United States Patent
Kusudou et al.

(10) Patent No.: US 6,962,955 B2
(45) Date of Patent: Nov. 8, 2005

(54) VINYL ALCOHOL POLYMER AND PROCESS FOR PRODUCING VINYL ALCOHOL POLYMER

(75) Inventors: Takeshi Kusudou, Okayama-Pref. (JP); Atsushi Jikihara, Okayama-Pref. (JP); Naoki Fujiwara, Okayama-Pref. (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 10/616,982

(22) Filed: Jul. 11, 2003

(65) Prior Publication Data

US 2004/0009357 A1 Jan. 15, 2004

(30) Foreign Application Priority Data

Jul. 11, 2002 (JP) ........................................ 2002-203144

(51) Int. Cl.$^7$ ............................................. C08F 116/06
(52) U.S. Cl. ............................. 525/56; 525/60; 525/61; 525/62
(58) Field of Search .............................. 525/56, 60, 61, 525/62

(56) References Cited

U.S. PATENT DOCUMENTS

| | | | | |
|---|---|---|---|---|
| 4,567,221 A | * | 1/1986 | Maruyama et al. | 524/436 |
| 4,708,947 A | * | 11/1987 | Maruyama et al. | 503/209 |
| 6,326,075 B1 | * | 12/2001 | Nagasaki et al. | 428/32.38 |
| 6,364,987 B1 | * | 4/2002 | Takada et al. | 156/244.11 |
| 6,689,432 B2 | * | 2/2004 | Kitamura et al. | 428/32.37 |
| 2002/0052449 A1 | | 5/2002 | Yoshida et al. | |

FOREIGN PATENT DOCUMENTS

| | | | |
|---|---|---|---|
| EP | 0 146 138 | | 6/1985 |
| EP | 0 164 134 | | 12/1985 |
| EP | 0 884 332 | | 12/1998 |
| EP | 1 008 605 | | 6/2000 |
| GB | 1052937 | | 12/1966 |
| JP | 61074887 | * | 4/1986 |
| JP | 361081405 A | * | 4/1986 |

\* cited by examiner

*Primary Examiner*—Bernard Lipman
(74) *Attorney, Agent, or Firm*—Oblon, Spivak, McClelland, Maier & Neustadt, P.C.

(57) ABSTRACT

A polyvinyl alcohol having hydrolyzed silyl group functionalized monomer units. The polyvinyl alcohol satisfies the following formulae (I) and (II) and the pH of an aqueous 4% solution of the polyvinyl alcohol is between 4 and 8:

$$20 < P \times S < 370 \quad (I)$$

wherein P is the viscosity-average degree of polymerization of the polyvinyl alcohol, and S is the content of the silyl group functionalized monomer units in the polyvinyl alcohol, $$0.1/100 \leq (A-B)/(B) \leq 50/100 \quad (II)$$

wherein A is the silicon atom content of the polyvinyl alcohol, B is the silicon atom content of the polyvinyl alcohol that has been washed with sodium hydroxide-containing methanol and then washed through Soxhlet extraction with methanol. The polyvinyl alcohol may be readily dissolved in water in the absence of sodium hydroxide or an acid; the aqueous solution has good viscosity stability; the binding force with inorganic substances is high; and a film formed of its mixture with an inorganic substance is excellent in resistance to water. The polyvinyl alcohol is favorable for coating agents for inkjet recording materials and thermal recording materials.

15 Claims, No Drawings

VINYL ALCOHOL POLYMER AND PROCESS FOR PRODUCING VINYL ALCOHOL POLYMER

BACKGROUND OF THE INVENTION

1. Field of the Invention

The present invention relates to a polyvinyl alcohol (i.e., a vinyl alcohol-based polymer). More precisely, the invention relates to a silyl group functionalized polyvinyl alcohol which may be readily dissolved in water to form aqueous solutions without the addition of an alkali such as sodium hydroxide or an acid and whose aqueous solutions have good viscosity stability. The binding force of the polymer with inorganic substances is high and films containing a mixture of the polymer with an inorganic substance have excellent water resistance.

The invention also relates to a method for producing the polyvinyl alcohol. The invention further relates to a coating agent that contains the polyvinyl alcohol and to coated products such as inkjet recording materials and thermal recording materials fabricated by applying the coating agent to a substrate.

2. Description of the Related Art

Vinyl alcohol-based polymers such as polyvinyl alcohols (hereinafter abbreviated as PVA) are known water-soluble synthetic polymers that may be used as a starting material for the synthetic fiber vinylon. PVA is also widely used in other fields such as paper processing, fiber processing, adhesives, stabilizers in emulsion polymerization and suspension polymerization, binders for inorganic substances, films, etc. As compared with other synthetic polymers, PVA is especially desirable for its mechanical strength and film-forming ability, and based on such its characteristics PVA is favorably used in clear coating agents that improve the surface characteristics of paper or binders in pigment coating.

Various attempts have been made to modify PVA and expand its use to other applications. One way is to introduce silicon (e.g., in the form of silyl groups) into PVA. A silyl group functionalized PVA provides excellent water-resistance and has excellent reactivity and adhesiveness to inorganic substances. For example, a method is known for producing silyl group functionalized PVA which comprises dissolving a silylating agent such as triethylchlorosilane in an organic solvent then adding a powdery PVA thereto and reacting them with stirring (JP-A 55-164614). However, the method is problematic in that it provides a homogeneously modified product only with difficulty and requires an additional step of reacting the PVA with a silylating agent in addition to the PVA production itself. From the industrial viewpoint, therefore, the method is impracticable.

Other methods of silyl group functionalized PVA production free from these problems have been proposed. For example, one method comprises hydrolyzing a copolymer of a vinyl alkoxysilane such as vinyltriethoxysilane and vinyl acetate (JP-A 50-123189); another method comprises hydrolyzing a copolymer of a silyl group functionalized acrylamide derivative and a vinyl ester such as vinyl acetate (JP-A 58-59203); still another method comprises hydrolyzing a copolymer of a specifically-substituted silyl group functionalized monomer and a vinyl ester (JP-A 58-79003); and still another method comprises hydrolyzing a copolymer of a silyl group functionalized allyl monomer and a vinyl ester (JP-A 58-164604).

However, the silyl group functionalized PVAs obtained in these methods have problems including (a) in preparing an aqueous solution of the silyl group functionalized PVA, some of the silyl group functionalized PVAs do not dissolve in water unless an alkali such as sodium hydroxide or an acid is present; (b) the viscosity stability of the aqueous solution of the silyl group functionalized PVA is not good; (c) the water-resistance of films formed of the aqueous solution of the silyl group functionalized PVA is not good; and (d) when films that contain the silyl group functionalized PVA and an inorganic substance are formed, they can not simultaneously provide sufficient binding force between the polymer and the inorganic substance and water-resistance.

An ionic hydrophilic group functionalized, silyl group functionalized PVA has been proposed (JP-A 59-182803); and it is reported that a PVA having a silanol group in its side branches has a strong interactivity with inorganic substances (Journal of the Chemical Society of Japan, 1994, (4), 365–370). However, even these modified PVAs do not solve the above-mentioned problems (a) to (d).

An object of the invention is to provide a silyl group functionalized polyvinyl alcohol which may be readily dissolved in water to form an aqueous solution without adding an alkali such as sodium hydroxide or an acid thereto; whose aqueous solutions have good viscosity stability; films of the aqueous solution have excellent water resistance; the binding force with inorganic substances is high; and films containing a mixture of the polyvinyl alcohol and an inorganic substance have excellent water resistance.

The invention also relates to a method for producing the polyvinyl alcohol. The invention further relates to a coating agent that contains the polyvinyl alcohol, and to coated products such as inkjet recording materials and thermal recording materials fabricated by applying the coating agent to a substrate.

SUMMARY OF THE INVENTION

A silyl group functionalized polyvinyl alcohol that satisfies specific requirements may be readily dissolved in water to form aqueous solutions without adding an alkali such as sodium hydroxide or an acid; the aqueous solutions thereof have good viscosity stability; films of the aqueous solutions have excellent water resistance; the binding force of the polyvinyl alcohol with inorganic substances is high; and films containing a mixture of the polyvinyl alcohol and one or more inorganic substances are resistant to water. Specifically, the invention includes a polyvinyl alcohol, which is obtained through hydrolysis of a polyvinyl ester that contains silyl group functionalized monomer units of formula (1):

(1)

wherein $R^1$ represents an alkyl group having from 1 to 5 carbon atoms; $R^2$ represents an alkoxyl or acyloxyl group optionally having an oxygen-containing substituent; and m indicates an integer of from 0 to 2, which satisfies the following formulae (I) and (II):

$$20 < P \times S < 370 \qquad (\mathrm{I})$$

wherein P indicates the viscosity-average degree of polymerization of the polyvinyl alcohol; S indicates the content (mol %) of the silyl group functionalized monomer units of formula (1) in the polyvinyl alcohol, $$0.1/100 \leq (A-B)/(B) \leq 50/100 \quad (II)$$

wherein A indicates the silicon atom content (unit: ppm) of the polyvinyl alcohol; B indicates the silicon atom content (unit: ppm) of the polyvinyl alcohol that has been washed with sodium hydroxide-containing methanol and then washed through Soxhlet extraction with methanol; A and B are measured by ashing a sample of the polyvinyl alcohol and subjecting it to ICP emission spectrometry, and of which an aqueous 4% solution has a pH of from 4 to 8.

DETAILED DESCRIPTION OF EMBODIMENTS OF THE INVENTION

As mentioned above, the polyvinyl alcohol of the invention is obtained through hydrolysis of a polyvinyl ester that contains silyl group functionalized monomer units of the following formula (1):

(1)

wherein $R^1$ represents an alkyl group having from 1 to 5 carbon atoms; $R^2$ represents an alkoxyl or acyloxyl group optionally having an oxygen-containing substituent; and m indicates an integer of from 0 to 2, and this must satisfy the following formulae (I) and (II):

$$20 < P \times S < 370 \quad (I)$$

wherein P indicates the viscosity-average degree of polymerization of the polyvinyl alcohol; S indicates the content (mol %) of the silyl group functionalized monomer units of formula (1) in the polyvinyl alcohol, $$0.1/100 \leq (A-B)/(B) \leq 50/100 \quad (II)$$

wherein A indicates the silicon atom content (unit: ppm) of the polyvinyl alcohol; B indicates the silicon atom content (unit: ppm) of the polyvinyl alcohol that has been washed with sodium hydroxide-containing methanol and then washed through Soxhlet extraction with methanol; A and B are measured by ashing a sample of the polyvinyl alcohol and subjecting it to ICP emission spectrometry, and further its aqueous 4% solution must have a pH of from 4 to 8.

The viscosity-average degree of polymerization (P) of the polyvinyl alcohol of the invention is measured according to JIS-K6726. The silyl group functionalized polyvinyl alcohol is re-hydrolyzed to a degree of hydrolysis of at least 99.5 mol %, and purified, and its intrinsic viscosity [η] is measured in water at 30° C., and from it, the viscosity-average degree of polymerization (P) of the polyvinyl alcohol is obtained according to the following formula:

$$P = ([\eta] \times 1000/8.29)^{(1/0.62)}$$

In the polyvinyl alcohol of the invention, the content S (mol %) of the silyl group functionalized monomer units may be determined through proton NMR of the corresponding polyvinyl ester before hydrolysis. Prior to measuring its proton NMR, before hydrolysis the polyvinyl ester is purified through reprecipitation with hexane-acetone to completely remove the unreacted silyl group functionalized monomer from the polymer, and then dried at 90° C. under reduced pressure for 2 days, and thereafter dissolved in CDCl₃ and subjected to the NMR analysis.

The polyvinyl alcohol of the invention must satisfy the relationship of 20<P×S<370, in which (P×S) is a product of the viscosity-average degree of polymerization (P) of the polyvinyl alcohol and the content (S) of the silyl group functionalized monomer units. Preferably, P×S satisfies the relationship of 40<P×S<360, more preferably 80<P×S<350. If P×S is 20 or less, then the water-resistance of films formed from the silyl group functionalized PVA and an inorganic substance may be poor and the binding force of the silyl group-containing PVA with inorganic substances may be low; but if P×S is 370 or more, then the silyl group functionalized PVA may not dissolve in water unless an alkali or an acid is added thereto.

The polyvinyl alcohol of the invention must satisfy the following relational formula:

$$0.1/100 \leq (A-B)/(B) \leq 50/100$$

wherein A indicates the silicon atom content (unit: ppm) of the polyvinyl alcohol, B indicates the silicon atom content (unit: ppm) of the polyvinyl alcohol that has been washed with sodium hydroxide-containing methanol and then washed through Soxhlet extraction with methanol where the silicon atom content is based on the total weight of the polymer.

Preferably, the range of (A−B)/(B) falls between 0.3/100 and 25/100, more preferably between 0.4/100 and 20/100. If the ratio (A−B)/(B) is over 50/100, it is unfavorable since the viscosity stability of the aqueous solution of the silyl group functionalized PVA may be too low. If (A−B)/(B) is smaller than 0.1/100, then it is impracticable since the water-resistance of the film formed of the silyl group functionalized PVA with an inorganic substance and the binding force of the silyl group functionalized PVA with the inorganic substance in the film may be too low and, in addition, the washing cost of the polyvinyl alcohol of which the ratio (A−B)/(B) is smaller than 0.1/100 is high when producing the polymer.

In obtaining the silicon atom content (B) of the polyvinyl alcohol, one standard method of washing the polymer comprises washing the polymer with sodium hydroxide-containing methanol at least five times (the washing operation comprises adding 10 parts by weight of a sodium hydroxide-containing methanol solution to one part by weight of the polyvinyl alcohol to such a degree that the molar ratio of sodium hydroxide to the vinyl alcohol monomer units of the polyvinyl alcohol is 0.01, then boiling the resulting mixture for one hour and separating the polymer through filtration), and then subjecting the thus-washed polymer to Soxhlet extraction with methanol for one week. In the washing process, the washing operation with sodium hydroxide-containing methanol and Soxhlet extraction with methanol are continued until the silicon atom content of the thus-processed polyvinyl alcohol no longer varies significantly. The frequency of the washing operation with sodium hydroxide-containing methanol and the duration of the Soxhlet extraction with methanol may be changed so long as the desired properties are achieved.

The silicon atom content (A) of the polyvinyl alcohol may be the overall silicon atom content of the polyvinyl alcohol. On the other hand, the silicon atom content (B) of the polyvinyl alcohol that has been washed with sodium hydroxide-containing methanol and then washed through Soxhlet extraction with methanol is the silicon atom content of the silyl group functionalized monomer directly incorporated into the backbone chain of the polyvinyl alcohol.

Before determining the silicon atom content (B), the polyvinyl alcohol is washed with sodium hydroxide-containing methanol, and the siloxane bond (—Si—O—Si—) therein is cut during the washing treatment. In this step, the silyl group functionalized monomer that is not directly incorporated into the backbone chain of the polyvinyl alcohol but is bonded to the backbone chain thereof via a siloxane bond (e.g., branched therefrom) is cut away from the polyvinyl alcohol and removed from the polymer. Therefore, the silicon atom content (B) of the polyvinyl alcohol is the silicon atom content of the polyvinyl alcohol wherein the silyl group functionalized monomer not directly incorporated into the backbone chain of the polymer has been removed. Accordingly, (A−B) in the above-mentioned relational formula, $$0.1/100 \leq (A-B)/(B) \leq 50/100$$

may indicate the silyl group content of the silyl group functionalized monomer units not directly incorporated into the backbone chain of the polyvinyl alcohol.

When the value (A−B)/(B) of the polyvinyl alcohol is large, it means that the polyvinyl alcohol contains a large amount of excess silyl group functionalized monomer units; and when the value (A−B)/(B) of the polyvinyl alcohol is small, it means that the amount of the excess silyl group functionalized monomer units not directly introduced into the backbone chain of the polyvinyl alcohol is small.

If the value (A−B)/(B) is too large, then a large number of siloxane bonds (—Si—O—Si—) may be formed between the excess silyl group functionalized monomer units and the silyl group functionalized monomer units incorporated into the backbone chain of the polymer. If so, it may be considered that the molecular mobility of the polyvinyl alcohol may be restricted and the viscosity stability of the aqueous solution of the polyvinyl alcohol may be thereby lowered, and, in addition, the interaction between the polyvinyl alcohol and inorganic substances may increase too much and a homogenous aqueous solution of a mixture of the polyvinyl alcohol and an inorganic substance may not be prepared.

If the value (A−B)/(B) is too small, then the proportion of the siloxane bonds (—Si—O—Si—) to be formed between the excess silyl group functionalized monomer units and the silyl group functionalized monomer units incorporated into the backbone chain of the polymer may be low and, as a result, the amount of the silyl groups in the polyvinyl alcohol will be lower and the interaction between the polyvinyl alcohol and inorganic substances will also be lower, and, in addition, when a film that contains the polyvinyl alcohol and an inorganic substance is formed, its water-resistance and binding force with the inorganic substance will be low.

The polyvinyl alcohol of the invention must be such that the pH of its aqueous 4% solution falls between 4 and 8. More preferably, the pH of its aqueous 4% solution falls between 4.5 and 7, even more preferably between 5 and 6.5. If the pH of the aqueous 4% solution of the polymer is lower than 4, it is unfavorable since the viscosity stability of the aqueous polyvinyl alcohol solution lowers; and if the pH of the aqueous 4% solution of the polymer is higher than 8, it is also unfavorable since the water-resistance of the film formed of the polyvinyl alcohol with an inorganic substance lowers.

Preferably, the polyvinyl alcohol of the invention satisfies the following formulae (III) and (IV):

$$200 < P < 3790 \times (0.2Y \times 1.40 + 2.87/Y) \quad \text{(III)}$$

$$1.4 < Y < 3.0 \quad \text{(IV)}$$

wherein P indicates the viscosity-average degree of polymerization of the polyvinyl alcohol, Y indicates the 1,2-glycol bond content (mol %) of the polyvinyl alcohol.

In formula (III), when P (viscosity-average degree of polymerization of the polyvinyl alcohol) is 200 or less, then the polyvinyl alcohol may lose film strength and other characteristics to PVA. On the other hand, when P is $3790 \times (0.2Y - 1.40 + 2.87/Y)$ or more, then the binding force of the polyvinyl alcohol with an inorganic substance in films formed of the polyvinyl alcohol and an inorganic substance may be lower.

The 1,2-glycol bond content (Y) of the polyvinyl alcohol of the invention may be controlled, for example, by copolymerizing ethylene carbonate with a vinyl ester monomer or by varying the polymerization temperature in the process of producing the polyvinyl alcohol by hydrolyzing a polyvinyl ester prepared through polymerization of a vinyl ester monomer. The 1,2-glycol bond content of the polyvinyl alcohol may be obtained from the peaks appearing in proton NMR.

To measure the proton NMR of the polyvinyl alcohol, the polymer is re-hydrolyzed to a degree of hydrolysis of at least 99.9 mol %, and then well washed with methanol. Next, the washed polyvinyl alcohol is dried at 90° C. under reduced pressure for 2 days, and dissolved in DMSO-$d_6$, a few drops of trifluoroacetic acid are added thereto, and its proton NMR is measured at 80° C. The 1,2-glycol bond content of the polyvinyl alcohol may be calculated from the peak at 3.2 to 4.0 ppm (integral value αa) that is derived from the methine in the vinyl alcohol units and the peak at 3.25 ppm (integral value β) that is derived from one methine of the 1,2-glycol bond, according to the following formula:

$$\text{1,2-Glycol bond content (mol \%)} = 100 \times \beta/\alpha$$

In formula (1) that represents the silyl group of the polyvinyl alcohol of the invention, $R^1$ is an alkyl group having from 1 to 5 carbon atoms, and $R^2$ is an alkoxyl group or an acyloxyl group, which may have an oxygen-containing substituent, and m indicates an integer of from 0 to 2.

The alkyl group having from 1 to 5 carbon atoms for $R^1$ includes, for example, methyl, ethyl, n-propyl, isopropyl, n-butyl, sec-butyl, tert-butyl, isobutyl, n-pentyl, tert-pentyl and isopentyl groups. The alkoxyl group for $R^2$ includes, for example, methoxy, ethoxy, propoxy, isopropoxy, butoxy, tert-butoxy, pentoxy, hexyloxy, octyloxy, lauryloxy and oleyloxy groups. The acyloxyl group includes, for example, acetoxy and propionyloxy groups. The alkoxyl or acyloxy group may have an oxygen-containing substituent. The substituent may be an alkoxyl group such as methoxy or ethoxy group.

The polyvinyl alcohol of the invention may be produced by copolymerizing a vinyl ester monomer with a monomer having the silyl group of formula (1), followed by hydrolysis of the resulting polyvinyl ester.

Alternatively, the polyvinyl alcohol of the invention may be produced by copolymerizing a vinyl ester monomer with a monomer having a silyl group of formula (1) in the presence of a thiol compound such as 2-mercaptoethanol, n-dodecylmercaptan, mercaptoacetic acid or 3-mercaptopropionic acid, followed by hydrolyzing the resulting polyvinyl ester. This method gives a polyvinyl alcohol terminated with a thiol compound-derived functional group introduced thereinto.

The vinyl ester monomer to be used in producing the polyvinyl alcohol includes, for example, vinyl formate, vinyl acetate, vinyl propionate, vinyl valerate, vinyl caprylate, vinyl laurate, vinyl stearate, vinyl benzoate, vinyl pivalate and vinyl versatate. Of these, especially preferred is vinyl acetate.

The monomer that has the silyl group of formula (1) and is radical-copolymerized with such a vinyl ester monomer includes, for example, compounds of formula (2):

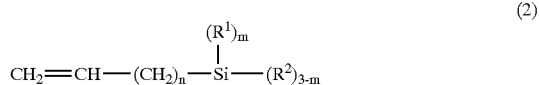

$$CH_2 = CH - (CH_2)_n - \underset{\underset{(R^2)_{3-m}}{|}}{Si} - (R^1)_m \quad (2)$$

wherein $R^1$ represents an alkyl group having from 1 to 5 carbon atoms; $R^2$ represents an alkoxyl or acyloxyl group optionally having an oxygen-containing substituent; m indicates an integer of from 0 to 2; and n indicates an integer of from 0 to 4, and compounds of formula (3):

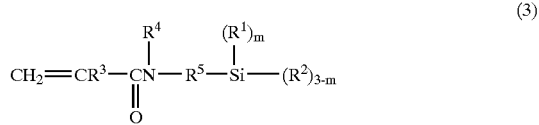

$$CH_2 = CR^3 - \underset{\underset{O}{\|}}{C}N - R^5 - \underset{\underset{(R^2)_{3-m}}{|}}{Si} - (R^1)_m \quad (3)$$

wherein $R^1$ represents an alkyl group having from 1 to 5 carbon atoms; $R^2$ represents an alkoxyl or acyloxyl group optionally having an oxygen-containing substituent; $R^3$ represents a hydrogen atom or a methyl group; $R^4$ represents a hydrogen atom, or an alkyl group having from 1 to 5 carbon atoms; $R^5$ represents an alkylene group having from 1 to 5 carbon atoms, or a divalent hydrocarbon group that contains an oxygen or nitrogen atom; and m indicates an integer of from 0 to 2.

In formulae (2) and (3), the alkyl group having from 1 to 5 carbon atoms for $R^1$ includes, for example, methyl, ethyl, n-propyl, isopropyl, n-butyl, sec-butyl, tert-butyl, isobutyl, n-pentyl, tert-pentyl and isopentyl groups. The alkoxyl group for $R^2$ includes, for example, methoxy, ethoxy, propoxy, isopropoxy, butoxy, tert-butoxy, pentoxy, hexyloxy, octyloxy, lauryloxy and oleyloxy groups. The acyloxyl group includes, for example, acetoxy and propionyloxy groups. The alkoxyl or acyloxy group may have an oxygen-containing substituent. The substituent may be an alkoxyl group such as methoxy or ethoxy group. The alkyl group having from 1 to 5 carbon atoms for $R^4$ includes, for example, methyl, ethyl, n-propyl, isopropyl, n-butyl, sec-butyl, tert-butyl, isobutyl, n-pentyl, tert-pentyl and isopentyl groups. The alkylene group having from 1 to 5 carbon atoms for $R^5$ includes, for example, methylene, ethylene, dimethylethylene, trimethylene, tetramethylene and pentamethylene groups. The divalent hydrocarbon group that contains an oxygen or nitrogen atom includes, for example, $-CH_2CH_2NHCH_2CH_2CH_2-$, $-CH_2CH_2NHCH_2CH_2-$, $-CH_2CH_2NHCH_2-$, $-CH_2CH_2N(CH_3)CH_2CH_2-$, $-CH_2CH_2N(CH_3)CH_2-$, $-CH_2CH_2OCH_2CH_2-CH_2-$, $-CH_2CH_2OCH_2CH_2-$, and $-CH_2CH_2OCH_2-$.

The monomer of formula (2) includes, for example, vinyltrimethoxysilane, vinylmethyldimethoxysilane, vinyldimethylmethoxysilane, vinyltriethoxysilane, vinylmethyldiethoxysilane, vinyldimethylethoxysilane, allyltrimethoxysilane, allylmethyldimethoxysilane, allyldimethylmethoxysilane, allyltriethoxysilane, allylmethyldiethoxysilane, allyldimethylethoxysilane, vinyltris(methoxyethoxy)silane, vinylisobutyldimethoxysilane, vinylethyldimethoxysilane, vinylmethoxydibutoxysilane, vinyldimethoxybutoxysilane, vinyltributoxysilane, vinylmethoxydihexyloxysilane, vinyldimethoxyhexyloxysilane, vinyltrihexyloxysilane, vinylmethoxydioctyloxysilane, vinyldimethoxyoctyloxysilane, vinyltrioctyloxysilane, vinylmethoxydilauryloxysilane, vinyldimethoxylauryloxysilane, vinylmethoxydioleyloxysilane, and vinyldimethoxyoleyloxysilane.

When a silyl group functionalized monomer of formula (2) where n is 1 or more is copolymerized with a vinyl ester monomer, the degree of polymerization of the polyvinyl ester obtained may lower. On the other hand, when vinyltrimethoxysilane is copolymerized with a vinyl ester monomer, the degree of polymerization of the polyvinyl ester obtained does not lower. Therefore, vinyltrimethoxysilane is favorable since its industrial production is easy and it is inexpensive.

The monomer of formula (3) includes, for example, 3-(meth)acrylamido-propyltrimethoxysilane, 3-(meth)acrylamido-propyltriethoxysilane, 3-(meth)acrylamido-propyltri(β-methoxyethoxy)silane, 2-(meth)acrylamido-ethyltrimethoxysilane, 1-(meth)acrylamido-methyltrimethoxysilane, 2-(meth)acrylamido-2-methylpropyltrimethoxysilane, 2-(meth)acrylamido-isopropyltrimethoxysilane, N-(2-(meth)acrylamido-ethyl)-aminopropyltrimethoxysilane, (3-(meth)acrylamido-propyl)-oxypropyltrimethoxysilane, 3-(meth)acrylamido-propyltriacetoxysilane, 2-(meth)acrylamido-ethyltriacetoxysilane, 4-(meth)acrylamido-butyltriacetoxysilane, 3-(meth)acrylamido-propyltripropionyloxysilane, 2-(meth)acrylamido-2-methylpropyltriacetoxysilane, N-(2-(meth)acrylamido-ethyl)-aminopropyltriacetoxysilane, 3-(meth)acrylamido-propylisobutyldimethoxysilane, 2-(meth)acrylamido-ethyldimethylmethoxysilane, 3-(meth)acrylamido-propylmethyldiacetoxysilane, 2-(meth)acrylamido-2-methylpropylhydrogendimethoxysilane, 3-(N-methyl-(meth)acrylamido)-propyltrimethoxysilane, and 2-(N-ethyl-(meth)acrylamido)-ethyltriacetoxysilane.

Of those monomers, preferred are 3-(meth)acrylamido-propyltrimethoxysilane and 3-(meth)acrylamido-propyltriacetoxysilane as their industrial production is relatively easy and they are inexpensive. In addition, 2-(meth)acrylamido-2-methylpropyltrimethoxysilane and 2-(meth)acrylamido-2-methylpropyltriacetoxysilane are also preferred since their amido bond is extremely stable to acid and alkali.

For copolymerizing such a silyl group functionalized monomer with a vinyl ester monomer, any known method including, for example, bulk polymerization, solution polymerization, suspension polymerization or emulsion polymerization may be used. Of those methods, generally bulk polymerization in the presence of no solvent or solution polymerization in a solvent such as alcohol are used. In a bulk polymerization or solution polymerization method, copolymerization may be effected either batchwise or continuously. Alcohol may be used for the solvent in solution polymerization, for example a lower alcohol such as methyl alcohol, ethyl alcohol, and/or propyl alcohol. Any known initiator may be used for the copolymerization, including, for example, an azo-type initiator such as 2,2'-azobisisobutyronitrile, 2,2'-azobis(2,4-dimethylvaleronitrile), 1,1'-azobis(cyclohexane-1-carbonitrile), 2,2'-azobis(N-butyl-2-methylpropionamide); and a peroxide initiator such as benzoyl peroxide, n-propyl peroxycarbonate. The temperature for the copolymerization is not specifically defined, but preferably falls between 50° C. and 180° C.

When a silyl group functionalized monomer is radical-polymerized with a vinyl ester monomer to produce the polyvinyl alcohol of the invention, they may be optionally copolymerized with any other copolymerizable monomer, if desired, not interfering with the effect of the invention. The comonomer includes, for example, α-olefins such as ethylene, propylene, 1-butene, isobutene, 1-hexene; carboxylic acids and their derivatives such as fumaric acid, maleic acid, itaconic acid, maleic anhydride, itaconic anhydride; acrylic acid and its salts, acrylates such as methyl acrylate, ethyl acrylate, n-propyl acrylate, isopropyl acrylate; methacrylic acid and its salts, methacrylates such as methyl methacrylate, ethyl methacrylate, n-propyl methacrylate, isopropyl methacrylate; acrylamide and acrylamide derivatives such as N-methylacrylamide, N-ethylacrylamide; methacrylamide and methacrylamide derivatives such as N-methylmethacrylamide, N-ethylmethacrylamide; vinyl ethers such as methyl vinyl ether, ethyl vinyl ether, n-propyl vinyl ether, isopropyl vinyl ether, n-butyl vinyl ether; hydroxy group functionalized vinyl ethers such as ethylene glycol vinyl ether, 1,3-propanediol vinyl ether, 1,4-butanediol vinyl ether; allyl acetate; allyl ethers such as propyl allyl ether, butyl allyl ether, hexyl allyl ether; oxyalkylene group functionalized monomers; isopropenyl acetate; hydroxy group functionalized α-olefins such as 3-buten-1-ol, 4-penten-1-ol, 5-hexen-1-ol, 7-octen-1-ol, 9-decen-1-ol, 3-methyl-3-buten-1-ol; sulfonic acid group functionalized monomers such as ethylenesulfonic acid, allylsulfonic acid, methallylsulfonic acid, 2-acrylamido-2-methylpropanesulfonic acid; and cationic group functionalized monomers such as vinyloxyethyltrimethylammonium chloride, vinyloxybutyltrimethylammonium chloride, vinyloxyethyldimethylamine, vinyloxymethyldiethylamine, N-acrylamidomethyltrimethylammonium chloride, N-acrylamidoethyltrimethylammonium chloride, N-acrylamidodimethylamine, allyltrimethylammonium chloride, methallyltrimethylammonium chloride, dimethylallylamine, allylethylamine. The amount of the monomer used that is copolymerizable with a silyl group functionalized monomer and a vinyl ester monomer may be generally at most 20 mol %, preferably at most 10 mol % of the total amount of all the monomers to be copolymerized, though varying depending on the object and the use thereof.

The polyvinyl ester obtained through copolymerization of a silyl group functionalized monomer and a vinyl ester monomer is then hydrolyzed in a solvent in a known method to form a polyvinyl alcohol.

In general, an alkaline substance is used as the catalyst for hydrolysis of the polyvinyl ester. Examples include alkali metal hydroxides such as potassium hydroxide, sodium hydroxide; and alkali metal alkoxides such as sodium methoxide. The amount of the alkaline substance to be used preferably falls between 0.004 and 0.5, more preferably between 0.005 and 0.05 in terms of the molar ratio thereof to the vinyl ester monomer units in the polyvinyl ester to be produced. The catalyst for hydrolysis may be added to the reaction system all at a time in the initial stage of hydrolysis, or may be intermittently added thereto in such a manner that a part thereof is added in the initial stage of hydrolysis and the remaining part thereof is during hydrolysis.

The solvent used in hydrolysis includes, for example, methanol, methyl acetate, dimethylsulfoxide, diethylsulfoxide, dimethylformamide. Of those solvents, preferred is methanol. The water content of the methanol is preferably between 0.001 and 1% by weight, more preferably between 0.003 and 0.9% by weight, even more preferably between 0.005 and 0.8% by weight.

The hydrolysis may be affected preferably at a temperature of 5 to 80° C., more preferably at 20 to 70° C. The time for hydrolysis is preferably 5 minutes to 10 hours, more preferably 10 minutes to 5 hours. The hydrolysis may be affected either batchwise or continuously. After the hydrolysis, if desired, the remaining catalyst may be neutralized. The neutralizing agent usable for it includes, for example, organic acids such as acetic acid, lactic acid; and ester compounds such as methyl acetate.

The degree of hydrolysis of the polyvinyl alcohol of the invention is not specifically defined but is preferably at least 80 mol %, more preferably at least 85 mol %, even more preferably at least 90 mol %. When a film of the polyvinyl alcohol with an inorganic substance is formed, its water-resistance is preferably higher. For it, the optimum degree of hydrolysis of the polyvinyl alcohol is at least 95 mol %.

The polyvinyl alcohol thus obtained through hydrolysis may be washed, if desired. This operation is useful as a means for controlling the value (A–B)/(B) of the polyvinyl alcohol mentioned hereinabove.

The washing liquid used includes, for example, lower alcohols such as methanol, lower fatty acid esters such as methyl acetate, and their mixtures. The washing liquid may contain a small amount of water, alkali or acid added thereto.

The washing method for the polyvinyl alcohol varies depending on the degree of polymerization in copolymerizing the vinyl ester monomer and the silyl group functionalized monomer, the degree of polymerization of the polyvinyl ester obtained through the copolymerization, and the degree of hydrolysis of the polyvinyl alcohol obtained through hydrolysis of the polyvinyl ester. For example, in one method a lower alcohol such as methanol, a lower fatty acid ester such as methyl acetate or a mixture thereof is used for the washing liquid and in an amount of from 1 to 20 times the weight of the wet polyvinyl alcohol obtained through hydrolysis of the copolymer of a vinyl ester monomer with a silyl group functionalized monomer (polyvinyl ester) in an alcohol solution and is not as yet dried, therefore containing alcohol and others, and the polyvinyl alcohol in that condition is washed with the washing liquid at a temperature falling between 20° C. and the boiling point of the washing liquid for 30 minutes to 10 hours or so.

The polyvinyl alcohol of the invention may be stored and transported while it is powdery. In its use, it may be still powdery or may be dispersed in liquid. The polyvinyl alcohol may be dissolved in water as an aqueous solution. In this case, the polyvinyl alcohol is once dispersed in water and then heated with stirring to give a homogenous aqueous solution. In this case, the polyvinyl alcohol may form a homogenous aqueous solution even though an alkali such as sodium hydroxide is not specifically added to the water.

The polyvinyl alcohol of the invention may be readily dissolved in water to form an aqueous solution without adding an alkali such as sodium hydroxide or an acid; the aqueous solutions have good viscosity stability; film of the polyvinyl alcohol of the aqueous solutions have excellent water resistance; the binding force of the polyvinyl alcohol with inorganic substances is high; and films of mixtures containing the polyvinyl alcohol and an inorganic substance are remarkably resistant to water. Having these advantages, the polymer may be used for coating agents. Coated objects fabricated by applying a coating agent that contains the polyvinyl alcohol of the invention onto a substrate are favorably used for inkjet recording materials and thermal recording materials.

In cases where a coating agent that contains the polyvinyl alcohol of the invention is applied onto a substrate to fabricate an inkjet recording material, the polyvinyl alcohol of the invention favorably acts as the binder in the ink-receiving layer of the material. In this case, the polyvinyl alcohol may be used alone or may be combined with any other water-soluble or water-dispersible resin. The water-soluble resin that may be combined with the polyvinyl alcohol of the invention includes, for example, albumin, gelatin, casein, starch, cationated starch, gum arabic, polyamide resins, melamine resins, poly(meth)acrylamide, polyvinylpyrrolidone, sodium poly(meth)acrylate, anion-modified PVA, sodium alginate, water-soluble polyesters, cellulose derivatives such as methyl cellulose, hydroxyethyl cellulose and carboxymethyl cellulose (CMC); and the water-dispersible resin that may be combined with the polyvinyl alcohol of the invention includes, for example, SBR latex, NBR latex, polyvinyl acetate emulsion, ethylene/vinyl acetate copolymer emulsion, poly(meth)acrylate emulsion, polyvinyl chloride emulsion; but these are not limitative.

In the case where the polyvinyl alcohol of the invention is used for the binder in the ink-receiving layer of an inkjet recording material, the filler that may be present in the ink-receiving layer includes, for example, precipitated silica, silica gel, fumed silica, colloidal silica, colloidal alumina, aluminum hydroxide, pseudoboehmite, clay, talc, diatomaceous earth, zeolite, calcium carbonate, alumina, zinc oxide, satin white, organic pigment, but these are not limiting. The ratio of the polyvinyl alcohol to the filler is not limiting, and usually the polyvinyl alcohol/the filler ratio preferably falls between 5/100 and 100/100 by weight, more preferably between 10/100 and 80/100 by weight, even more preferably between 15/100 and 60/100.

When the polyvinyl alcohol of the invention is used for the binder in the ink-receiving layer of an inkjet recording material, it may be combined with a cationic resin serving as an ink fixer. The cationic resin may be a monomer, oligomer or polymer, preferably an oligomer or polymer having a primary to tertiary amine or a quaternary ammonium salt that may be dissociated to be cationic when dissolved in water. For example, the monomer, may be dimethylamine-epichlorohydrin polycondensate, acrylamide-diallylamine copolymer, polyvinylamine copolymer, dimethyldiallylammonium chloride polymer, polyethylenimine, but these are not limiting.

For the substrate for the inkjet recording material, any known transparent or non-transparent support substrate may be used. The transparent support substrate may be a film or sheet of, for example, polyester, polystyrene, polyvinyl chloride, polymethyl methacrylate, cellulose acetate, polycarbonate, polyimide, cellophane or celluloid, or paper of high transparency. The non-transparent support substrate may be ordinary paper, pigment-coated paper, cloth, wood, metal plate, synthetic paper, as well as synthetic resin film or sheet that has been processed for non-transparency.

A coating agent that contains the polyvinyl alcohol of the invention may be applied onto a substrate to fabricate an inkjet recording material, for example, by a method that comprises dissolving or dispersing the polyvinyl alcohol and optionally a filler, an ink fixer and others in an aqueous medium to prepare a coating agent, and applying the thus-prepared coating agent onto a substrate by the use of any known size press, air knife coater, roll coater, bar coater, blade coater, curtain coater, cast coater or the like. For the aqueous medium, preferred is water. For the aqueous solvent, an aqueous solution prepared by dissolving any of water-soluble organic solvents, acids, bases or salts in water may be used. The coating agent that contains the polyvinyl alcohol of the invention is applied onto a substrate to fabricate an inkjet recording material. The coating agent that contains the polyvinyl alcohol is applied onto a substrate to impregnate the coating agent therein, or to form a PVA-coating layer on one or both surfaces thereof. Thus fabricated, the water-resistance of the inkjet recording material and the binding force of PVA with an inorganic substance therein are good.

In case where a coating agent that contains the polyvinyl alcohol of the invention is applied onto a substrate to fabricate a thermal recording material, the polyvinyl alcohol of the invention may be in any of the overcoat layer, the thermo-sensitive coloring layer or the undercoat layer of the material. In particular, the polyvinyl alcohol of the invention is preferred for the binder in the overcoat layer and the thermo-sensitive coloring layer of the material.

The thermal recording material in which the polyvinyl alcohol of the invention is in the overcoat layer has good water-resistance and good plasticizer resistance. When the polyvinyl alcohol of the invention is in the overcoat layer of a thermal recording material, it is generally combined with a crosslinking agent. The crosslinking agent is preferably an aldehyde compounds such as glyoxal, glutaraldehyde; zirconium compounds such as ammonium zirconium carbonate; titanium compounds such as titanium lactate; colloidal silica; epoxy compounds such as polyamidamine-epichlorohydrin; and polyoxazoline. Not interfering with the water-resistance and the plasticizer resistance thereof, the polyvinyl alcohol of the invention may be combined with any known polymer or a dispersion thereof such as those mentioned below. Specific examples of the polymer and its dispersion are starch and its derivatives; cellulose derivatives such as hydroxymethyl cellulose, hydroxyethyl cellulose, carboxymethyl cellulose, methyl cellulose, ethyl cellulose; other water-soluble polymers such as polyvinyl alcohol, sodium polyacrylate, polyvinylpyrrolidone, acrylamide/acrylate copolymer, acrylamide/acrylate/methacrylic acid terpolymer, alkali salt of styrene/maleic anhydride copolymer, alkali salt of isobutylene/maleic anhydride copolymer, polyacrylamide, sodium alginate, gelatin, casein; emulsions of polyvinyl acetate, polyurethane, polyacrylic acid, polyacrylate, vinyl chloride/vinyl acetate copolymer, polybutyl methacrylate, ethylene/vinyl acetate copolymer; and latexes of styrene/butadiene copolymer, styrene/butadiene/acrylic copolymer.

When the polyvinyl alcohol of the invention is in the overcoat layer of a thermal recording material, the filler that may be combined with the polyvinyl alcohol may be any of kaolin, clay, talc, calcium carbonate, calcined clay, titanium oxide, diatomaceous earth, precipitated silica, silica gel, colloidal silica, aluminum oxide, aluminum hydroxide, synthetic aluminum silicate, synthetic magnesium silicate, polystyrene particles, polyvinyl acetate particles, urea-formalin resin particles or combinations thereof. In the overcoat layer, the amount of the filler is preferably at least 20% by weight of the total amount of all the components of the overcoat layer. If the amount is smaller than 20% by weight, the water-resistance, the oil resistance and the plasticizer resistance of the layer may be poor.

The amount of the overcoat layer to be formed in fabricating a thermal recording material may be suitably selected within a range which the thermal conduction from the thermal head of a thermal recording apparatus to the thermo-sensitive coloring layer of the thermal recording material is not retarded, and is generally from 1 to 10 g/m$^2$, preferably from 2 to 7 g/m$^2$.

The thermal recording material that contains the polyvinyl alcohol of the invention in its thermo-sensitive coloring layer may have good water-resistance and good plasticizer resistance. Although not specifically defined, the thermosensitive dye to be in the thermo-sensitive coloring layer may be any and every one that is generally in ordinary pressure-sensitive recording materials or thermal recording materials. Specific examples of the thermo-sensitive dye are triarylmethane compounds such as 3,3-bis(p-dimethylaminophenyl)-6-dimethylaminophthalide (crystal violet lactone), 3-(p-dimethylaminophenyl)-3-(1,2-dimethylindol-3-yl)phthalide, 3-(p-dimethylaminophenyl)-3-(2-phenylindol-3-yl)phthalide, 3,3-bis(9-ethylcarbazol-3-yl)-5-dimethylaminophthalide; diphenylmethane compounds such as 4,4'-bisdimethylaminobenzhydrin benzyl ether, N-halophenyl-leucoauramine; xanthene compounds such as rhodamine B-anilinolactam, 3-diethylamino-7-benzylaminofluoran, 3-diethylamino-7-butylamino-fluoran, 3-diethylamino-7-(chloroanilino)fluoran, 3-diethylamino-6-methyl-7-anilinofluoran, 3-piperidino-6-methyl-7-anilinofluoran, 3-ethyltolylamino-6-methyl-7-anilinofluoran, 3-cyclohexylmethylamino-6-methyl-7-anilinofluoran, 3-diethylamino-6-chloro-7-(β-ethoxyethyl) aminofluoran, 3-diethylamino-6-chloro-7-(γ-chloropropyl) aminofluoran, 3-(N-ethyl-N-isoamyl)-6-methyl-7-phenylaminofluoran, 3-dibutylamino-6-methyl-7-anilinofluoran; thiazine compounds such as benzoyl-leucomethylene blue, p-nitrobenzoyl-leucomethylene blue; and spiro compounds such as 3-methyl-spiro-dinaphthopyran, 3-ethyl-spiro-dinaphthopyran, 3-benzylspiro-dinaphthopyran, 3-methylnaphtho-(3-methoxy-benzo)-spiropyran and combinations thereof. These thermo-sensitive dyes are suitably selected in accordance with the use of the thermal recording material to be fabricated, and one or more of them are used either singly or as a mixture of two or more of them.

For the developer that may be in the thermo-sensitive coloring layer, preferred are phenol derivatives and aromatic carboxylic acid derivatives, and more preferred are bisphenols. Specific examples of the phenol derivatives are p-octylphenol, p-tert-butylphenol, p-phenylphenol, 1,1-bis (p-hydroxyphenyl)propane, 2,2-bis(p-hydroxyphenyl) propane, 1,1-bis(p-hydroxyphenyl)pentane, 1,1-bis(p-hydroxyphenyl)hexane, 2,2-bis(p-hydroxyphenyl)hexane, 1,1-bis(p-hydroxyphenyl)-2-ethylhexane, 2,2-bis(4-hydroxy-3,5-dichlorophenyl)propane, dihydroxydiphenyl ether. Specific examples of the aromatic carboxylic acid derivatives are p-hydroxybenzoic acid, ethyl p-hydroxybenzoate, butyl p-hydroxybenzoate, 3,5-di-tert-butylsalicylic acid, 3,5-di-α-methylbenzylsalicylic acid, and polyvalent metal salts of these carboxylic acids.

When the polyvinyl alcohol of the invention is used in the thermo-sensitive coloring layer of a thermal recording material, it may be combined with any known polymer or a dispersion thereof such as those mentioned below, not interfering with the water-resistance and the plasticizer resistance thereof. Specific examples of the polymer and its dispersion are starch and its derivatives; cellulose derivatives such as hydroxymethyl cellulose, hydroxyethyl cellulose, carboxymethyl cellulose, methyl cellulose, ethyl cellulose; other water-soluble polymers such as gum arabic, polyvinyl alcohol, alkali salt of acrylate (or methacrylate) copolymer, polyvinylpyrrolidone, acrylamide (or methacrylamide)/acrylate (or methacrylate) copolymer, alkali salt of styrene/maleic anhydride copolymer, alkali salt of isobutylene/maleic anhydride copolymer, alkali salt of diisobutylene/maleic anhydride copolymer, polyacrylamide, sodium alginate, gelatin, casein; emulsions of polyvinyl acetate, polyurethane, polyacrylic acid, polyacrylate, vinyl chloride/vinyl acetate copolymer, polybutyl methacrylate, ethylene/vinyl acetate copolymer; and latexes of styrene/butadiene copolymer, styrene/butadiene/acrylic copolymer and combinations thereof.

A lubricant may be in the thermo-sensitive coloring layer, which includes, for example, higher fatty acids, higher fatty acid amides, metal salts of higher fatty acids, paraffin wax, microcrystalline wax.

The filler that may be in the thermo-sensitive coloring layer includes, for example, kaolin, clay, talc, calcium carbonate, calcined clay, titanium oxide, diatomaceous earth, precipitated silica, silica gel, colloidal silica, aluminum oxide, aluminum hydroxide, synthetic aluminum silicate, synthetic magnesium silicate, polystyrene particles, polyvinyl acetate particles, urea-formalin resin particles. The amount of the filler to be in the thermo-sensitive coloring layer is preferably at least 20% by weight of the total amount of all the components of the layer.

In case where a coating agent that contains the polyvinyl alcohol of the invention is applied onto a substrate to fabricate a thermal recording material, any known method of air knife coating, blade coating, gravure coating, roll coating, spraying, dipping, bar coating or extrusion coating may be used.

Apart from the above, the polyvinyl alcohol of the invention may be used for other various applications, based on the function of the functional groups in the polymer, such as a hydroxyl group, a vinyl ester group and a silyl group. Examples of the applications are internal sizing agents for paper, fiber processing agents, dyes, coating agents for glass fibers, surface coating agents for metals, other coating agents such as antifogging agent, adhesives for wood, paper, aluminum foil and plastics, binders for nonwoven fabrics, binders for fibers, binders for construction materials such as gypsum boards and fiber plates, thickeners for various emulsion adhesives, additives to urea resin adhesives, additives to cement and mortar, various adhesives such as hot-melt adhesives and pressure-sensitive adhesives, dispersants for emulsion polymerization of various ethylenic unsaturated monomers such as ethylene, vinyl acetate and vinyl chloride, stabilizers for pigment dispersion in paints and adhesives, dispersion stabilizers for suspension polymerization of various ethylenic unsaturated monomers such as vinyl chloride, vinylidene chloride, styrene, (meth)acrylic acid and vinyl acetate, shaped articles such as fibers, films, sheets, pipes, tubes, water-soluble fibers and temporary films, hydrophilicating agents for hydrophobic resins, additives to synthetic resins such as those to bicomponent fibers, films and other shaped articles, soil improvers, and soil stabilizers.

Polyvinyl acetal that is obtained through acetalization of the polyvinyl alcohol of the invention with an aldehyde compound such as acetaldehyde or butyraldehyde is useful, for example, for interlayers for safety glass, ceramic binders, ink dispersants and photosensitive materials.

EXAMPLES

The invention is described in more detail with reference to the following Examples and Comparative Examples which are not intended to further limit the invention. Unless otherwise specifically indicated, "part" and "%" in the following Examples and Comparative Examples are all by weight.

I. Silyl Group Functionalized Polyvinyl Alcohol

PVA was produced according to the method mentioned below, and the degree of hydrolysis thereof, the silyl group functionalized monomer unit content thereof, and the silicon atom content thereof were measured as described below.

Degree of Hydrolysis of PVA:

The degree of hydrolysis of PVA is determined according to the method described in JIS-K6726 incorporated herein by reference in its entirety.

Silyl Group Functionalized Monomer Unit Content of PVA:

Before hydrolysis, a polyvinyl ester is purified through reprecipitation with hexane-acetone so that the non-reacted silyl group functionalized monomer is completely removed from the polymer. Next, the thus-processed polymer is dried under reduced pressure at 90° C. for 2 days, and then dissolved in CDCl$_3$ to prepare a sample to be analyzed. The sample is analyzed by the use of a 500 MHz proton-NMR device (JEOL GX-500), and the silyl group functionalized monomer unit content of PVA is thus determined.

Analytical Method of Silicon Atom Content of PVA:

The silicon atom content of PVA is determined by the use a Jares Ash's ICP spectrophotometer IRIS AP, according to the method mentioned above.

PVA1:

2450 parts of vinyl acetate, 315 parts of methanol and 735 parts of methanol solution containing 1% by weight of vinyltrimethoxysilane were fed into a 6-liter separable flask equipped with a stirrer, a temperature sensor, a dropping funnel and a reflux condenser, purged with nitrogen with stirring, and then heated up to 60° C. To this was added 20 parts of methanol containing 0.8 parts of 2,2'-azobisisobutyronitrile, and the polymerization was initiated with it. From the start of the polymerization, 55 parts of methanol solution containing 1% by weight of vinyltrimethoxysilane was added to the reaction system and the polymerization was continued for 4 hours and then stopped. At the time when the polymerization was stopped, the solid concentration in the system was 34.6%. Next, methanol vapor was introduced into the system to expel the non-reacted vinyl acetate monomer from it. This gave 40% polyvinyl ester-containing methanol solution.

To the 40% polyvinyl ester-containing methanol solution, added were methanol and methanol solution containing 10% by weight of sodium hydroxide in that order with stirring so that the molar ratio of sodium hydroxide to the vinyl acetate units in the polyvinyl ester could be 0.02 and the solid concentration of the polyvinyl ester could be 30% by weight. In that condition, hydrolysis of the polyvinyl ester was started at 40° C.

With the progress of the hydrolysis, a gel was formed and it was taken out of the reaction system immediately after its formation. Then, this was ground, and 1 hour after the start of the hydrolysis, this was neutralized with methyl acetate added thereto to obtain PVA swollen with methanol. To this, added was methanol of 6 times the weight of the methanol-swollen PVA (bath ratio, 6 times), and this was washed under reflux for 1 hour and then dried at 65° C. for 16 hours to obtain PVA.

The vinyltrimethylsilane unit content of the thus-obtained PVA was 0.20 mol %, the 1,2-glycol bond content thereof was 1.56 mol %, the degree of hydrolysis thereof was 98.5 mol %, and the degree of polymerization thereof was 1700. The value (A−B)/(B) obtained according to the method of determining the silicon atom content of PVA mentioned above was 10.9/100, and the pH of the aqueous 4% PVA solution was 6.0.

PVA2 to PVA12:

Various PVAs (PVA2 to PVA12) were produced in the same manner as that for PVA1 except that the amount of vinyl acetate and methanol to be fed, the type and the amount of the silyl group functionalized monomer to be fed, the presence or absence of comonomer, the type and the amount of the polymerization initiator to be used, the polymerization condition and the hydrolysis condition were varied as in Table 1. However, when the polymerization temperature was over the boiling point of the polymerization system, a 5-liter autoclave equipped with a stirrer, a temperature sensor and a feed pump was used for the reactor. The analytic data of the thus-obtained PVAs are shown in Table 2.

PVA13:

PVA13 was produced in the same manner as that for PVA1, however, the polyvinyl ester hydrolysis was effected by addition of methanol solution containing 10% by weight of sodium hydroxide in such a manner that the molar ratio of sodium hydroxide to the vinyl acetate units in the polyvinyl ester could be 0.01. The analytic data of the thus-obtained PVA are shown in Table 2.

PVA14:

PVA14 was produced in the same manner as that for PVA3, however, the polyvinyl ester hydrolysis was effected by addition of methanol solution containing 10% by weight of sodium hydroxide in such a manner that the molar ratio of sodium hydroxide to the vinyl acetate units in the polyvinyl ester could be 0.01. The analytic data of the thus-obtained PVA are shown in Table 2.

PVA15:

PVA15 was produced in the same manner as that for PVA1, however, the washing operation with methanol was omitted. The analytic data of the thus-obtained PVA are shown in Table 4.

PVA16:

PVA16 was produced in the same manner as that for PVA1, however, PVA obtained through hydrolysis was washed through Soxhlet extraction with methanol before it was neutralized with methyl acetate. The analytic data of the thus-obtained PVA are shown in Table 4.

PVA17:

PVA17 was produced in the same manner as that for PVA1, however, PVA obtained through hydrolysis was neutralized with acetic acid in place of methyl acetate, the amount of acetic acid used for neutralization was 5 molar times that of sodium hydroxide used for hydrolysis, and the washing operation with methanol (bath ratio, 6 times) was effected at room temperature for 1 hour. The analytic data of the thus-obtained PVA are shown in Table 4.

PVA18:

PVA18 was produced in the same manner as that for PVA1, for which, however, the neutralization with methyl acetate was omitted, and the washing operation (bath ratio, 6 times) with methanol was effected at room temperature for 1 hour. The analytic data of the thus-obtained PVA are shown in Table 4.

PVA19 to PVA23:

Various PVAs (PVA19 to PVA23) were produced in the same manner as that for PVA1 except that the amount of vinyl acetate and methanol to be fed, the presence or absence and the amount, if used, of the silyl group functionalized monomer to be fed, the presence or absence of comonomer, the amount of the polymerization initiator used and the polymerization condition were varied as in Table 3. The analytic data of the thus-obtained PVAs are shown in Table 4. Since PVA23 was insoluble in water, it was dissolved in aqueous 1% sodium hydroxide solution and the degree of polymerization thereof was measured in the solution.

PVA24:

PVA24 was produced in the same manner as that for PVA19, however, the polyvinyl ester hydrolysis was effected by addition of methanol solution containing 10% by weight of sodium hydroxide in such a manner that the molar ratio of sodium hydroxide to the vinyl acetate units in the polyvinyl ester could be 0.01. The analytic data of the thus-obtained PVA are shown in Table 4.

PVA25:

PVA25 was produced in the same manner as that for PVA2 1, however, the polyvinyl ester hydrolysis was effected by addition of methanol solution containing 10% by weight of sodium hydroxide in such a manner that the molar ratio of sodium hydroxide to the vinyl acetate units in the polyvinyl ester could be 0.01. The analytic data of the thus-obtained PVA are shown in Table 4.

Example 1 to Example 14

PVA1 to PVA14 were tested for the viscosity stability of the aqueous solution of PVA, the water-resistance of the PVA film with an inorganic substance, and the binding force of PVA with inorganic substances, according to the test methods mentioned below. The results are shown in Table 5.

Comparative Example 1 to Comparative Example 11

PVA15 to PVA25 were tested for the viscosity stability of the aqueous solution of PVA, the water-resistance of the PVA film with an inorganic substance, and the binding force of PVA with inorganic substances, according to the test methods mentioned below. The results are shown in Table 5.

Viscosity Stability of Aqueous PVA Solution:

An aqueous solution of 8% PVA is prepared and left in a thermostat at 10° C. Immediately after the temperature of the aqueous PVA solution has reached 10° C. and after 7 days, the viscosity of the solution is measured. The viscosity of the aqueous PVA solution after 7 days is divided by the viscosity thereof immediately after its temperature has reached 10° C. (after 7 days/immediately after the temperature control). From the data, the PVA tested is evaluated according to the criteria mentioned below.

A: Less than 1.5 times.
B: From 1.5 times to less than 2.5 times.
C: From 2.5 times to less than 4.0 times.
D: 4.0 times or more, but PVA did not gel.
E: PVA lost fluidity and gelled.

Water-resistance of PVA Film with Inorganic Substance:

An aqueous 4% PVA solution is prepared, to which is added an aqueous dispersion of 20% colloidal silica (Nissan Chemical Industry's Snowtex ST-O) in such a manner that the solid content-based ratio by weight of PVA/colloidal silica may be 100/10, and the resulting mixture is cast at 20° C. to form a film having a thickness of 40 μm. The film is heated at 120° C. for 10 minutes, and then cut to give a test piece having a length of 10 cm and a width of 10 cm. The test piece is dipped in distilled water at 20° C. for 24 hours, and then taken out (recovered), water having adhered to its surface is wiped away with cotton gauze, and its wet weight is measured. After thus measured, the wet test piece is dried at 105° C. for 16 hours, and its dry weight is measured. The wet weight of the test piece is divided by the dry weight thereof, and this is a degree of swelling (times). From it, the PVA tested is evaluated according to the criteria mentioned below.

A: Less than 5.0 times.
B: From 5.0 times to less than 8.0 times.
C: From 8.0 times to less than 12.0 times.
D: 12.0 times or more, but the test piece dipped in distilled water could be recovered.
E: The test piece dipped in distilled water could not be recovered.

Binding Force of PVA with Inorganic Substance:

Silica (Mizusawa Chemical Industry's Mizukasil P78D) and 0.2%, based on the weight of silica, of a dispersant (Toa Synthetic Chemical Industry's Aron T40) are dispersed in water by the use of a homogenizer to prepare an aqueous dispersion of 20% silica. To the aqueous silica dispersion, added is an aqueous 10% PVA solution in such a manner that the solid content-based ratio by weight of silica/PVA may be 100/30, and a necessary amount of water is added thereto to prepare a silica-dispersed PVA solution having a concentration of 15%.

The silica-dispersed PVA solution thus obtained is applied onto the surface of woodfree paper, using a wire bar. Its amount applied to the paper is 60 g/m² in a basic weight. Thus coated, the paper is dried with a hot air drier at 100° C. for 3 minutes. This is a coated test sample. After dried, the amount of the coating layer on the paper (test sample) is 11 g/m².

Using an IGT printability tester, the sample is tested under a printing pressure of 50 kg/cm². The printing speed (cm/sec) at which the surface of the test sample has peeled is read, and this indicates the surface strength of the test sample. From it, the binding force of PVA tested herein is evaluated according to the criteria mentioned below. In testing the sample with the IGT printability tester, used is IGT Pick Oil M (by Dai-Nippon Ink Chemical Industry), and a mechanism of spring drive B of the tester is employed.

A: 260 cm/sec or higher.
B: From 220 cm/sec to lower than 260 cm/sec.
C: From 180 cm/sec to lower than 220 cm/sec.
D: From 140 cm/sec to lower than 180 cm/sec.
E: Lower than 140 cm/sec.

TABLE 1

| Type of PVA | Initial Feeding | | Silyl Group-Having Monomer | | | Other Monomer | |
| | VAc[1] | MeOH[1] | Type | MeOH Solution Concentration (%) | Amount of Initial Feed[1] | Amount of Additional Feed[1] | Type | Amount of Initial Feed |
|---|---|---|---|---|---|---|---|---|
| PVA1 | 2450 | 315 | VMS | 1.0 | 735 | 55 | — | — |
| PVA2 | 1750 | 962 | VMS | 1.0 | 788 | 59 | — | — |
| PVA3 | 1225 | 1354 | VMS | 1.0 | 921 | 97 | — | — |
| PVA4 | 2240 | 560 | VMS | 1.0 | 6.72[2] | 35 | — | — |
| PVA5 | 2240 | 560 | VMS | 1.0 | 11.77[2] | 62 | — | — |
| PVA6 | 1820 | 980 | VMS | 2.0 | 19.20[2] | 50 | — | — |

TABLE 1-continued

| | | | | | | | | |
|---|---|---|---|---|---|---|---|---|
| PVA7 | 1820 | 980 | VMS | 2.0 | 19.20[2] | 50 | — | — |
| PVA8 | 1400 | 1681 | VMS | 0.5 | 419 | 29 | — | — |
| PVA9 | 2450 | 315 | VMS | 1.0 | 735 | 55 | VC | 8.4 |
| PVA10 | 2450 | 1400 | AMPTMS | 4.0 | 8.2 | 50 | — | — |
| PVA11 | 2450 | 315 | VMS | 1.0 | 735 | 55 | VC | 2.32 |
| PVA12 | 300 | 2729 | VMS | 0.5 | 421 | 55 | — | — |

| | Initiator | | | Polymerization Condition | | | Hydrolysis Condition | |
|---|---|---|---|---|---|---|---|---|
| Type of PVA | Type | Amount of Initial Feed[1] | Amount of Additional Feed[1] | Polymerization Temperature (°C.) | Polymerization Time (hr) | Polymer-ization Solid Concentration (%) | Solid Concentration (%) | NaOH molar ratio |
| PVA1 | AIBN | 0.8 | — | 60 | 4.0 | 34.6 | 30 | 0.02 |
| PVA2 | AIBN | 2.2 | — | 60 | 4.0 | 24.8 | 30 | 0.02 |
| PVA3 | AIBN | 2.4 | — | 60 | 5.0 | 24.1 | 35 | 0.015 |
| PVA4 | AIBN | 0.14 | 0.28 | 80 | 4.0 | 27.6 | 30 | 0.02 |
| PVA5 | V-40 | 0.01 | 0.13 | 120 | 3.5 | 27.7 | 30 | 0.015 |
| PVA6 | VAm-110 | 0.13 | 2.17 | 150 | 4.0 | 22.9 | 35 | 0.015 |
| PVA7 | VAm-110 | 0.03 | 1.54 | 165 | 4.0 | 23.1 | 40 | 0.02 |
| PVA8 | NPP | 2.9 | 3.6 | 50 | 4.0 | 17.9 | 35 | 0.025 |
| PVA9 | AIBN | 1.2 | — | 60 | 4.0 | 34.2 | 30 | 0.02 |
| PVA10 | AIBN | 0.8 | — | 60 | 4.0 | 34.5 | 30 | 0.025 |
| PVA11 | AIBN | 1.5 | — | 60 | 4.0 | 33.9 | 30 | 0.02 |
| PVA12 | AIBN | 2.5 | — | 60 | 5.0 | 6.8 | 60 | 0.02 |

VMS: vinyltrimethoxysilane,
AMPTMS: 2-acrylamido-2-methylpropyltrimethoxysilane,
VC: vinylene carbonate,
AIBN: 2,2'-azobisisobutyronitrile,
V-40: 1,1'-azobis(cyclohexane-1-carbonitrile),
VAm-110: 2,2'-azobis(N-butyl-2-methylpropionamide),
NPP: n-propyl peroxycarbonate
[1]Parts by weight
[2]Not diluted with methanol, the silyl group-having monomer was fed directly as it was.

TABLE 2

| Type of PVA | Silyl Group Functionalized Monomer Content (mol %) | Degree of Polymerization | 1,2-Glycol Bond Content (mol %) | Degree of Hydrolysis (mol %) | (A − B)(B) | pH of 4% Aqueous Solution |
|---|---|---|---|---|---|---|
| PVA1 | 0.20 | 1700 | 1.56 | 98.5 | 10.9/100 | 6.0 |
| PVA2 | 0.30 | 1000 | 1.56 | 98.7 | 9.2/100 | 6.0 |
| PVA3 | 0.50 | 500 | 1.56 | 98.2 | 0.7/100 | 6.0 |
| PVA4 | 0.20 | 1700 | 1.82 | 98.4 | 12.5/100 | 5.0 |
| PVA5 | 0.35 | 1000 | 2.34 | 98.5 | 9.8/100 | 4.0 |
| PVA6 | 0.70 | 500 | 2.74 | 98.5 | 0.6/100 | 4.0 |
| PVA7 | 0.90 | 400 | 2.95 | 98.5 | 0.5/100 | 5.0 |
| PVA8 | 0.10 | 750 | 1.44 | 98.7 | 1.2/100 | 6.0 |
| PVA9 | 0.20 | 1700 | 1.90 | 98.5 | 10.5/100 | 6.0 |
| PVA10 | 0.10 | 2500 | 1.56 | 98.6 | 0.3/100 | 6.0 |
| PVA11 | 0.20 | 1700 | 2.50 | 98.5 | 10.3/100 | 6.0 |
| PVA12 | 0.50 | 150 | 1.56 | 98.5 | 0.4/100 | 6.0 |
| PVA13 | 0.20 | 1700 | 1.56 | 93.2 | 9.8/100 | 6.0 |
| PVA14 | 0.50 | 500 | 1.56 | 91.2 | 0.5/100 | 6.0 |

TABLE 3

| Type of PVA | Initial Feeding VAc[1] | Initial Feeding MeOH[1] | Silyl Group-Having Monomer Type | MeOH Solution Concentration (%) | Amount of Initial Feed[1] | Amount of Additional Feed[1] | Other Monomer Type | Other Monomer Amount of Initial Feed[1] | Initiator Type | Initiator Amount of Initial Feed[1] | Initiator Amount of Additional Feed[1] |
|---|---|---|---|---|---|---|---|---|---|---|---|
| PVA19 | 2450 | 1050 | — | — | — | — | — | — | AIBN | 0.6 | — |
| PVA20 | 1750 | 1750 | — | — | — | — | — | — | AIBN | 1.3 | — |
| PVA21 | 1225 | 2275 | — | — | — | — | — | — | AIBN | 2.5 | — |
| PVA22 | 1225 | 1725 | VMS | 0.1 | 550 | 58 | — | — | AIBN | 2.6 | — |

TABLE 3-continued

| PVA23 | 2450 | 436 | VMS | 3.0 | 614 | 46 | — | — | AIBN | 0.9 | — |

| Type of PVA | Polymerization Condition ||| Hydrolysis Condition ||
| --- | --- | --- | --- | --- | --- |
| | Polymerization Temperature (° C.) | Polymerization Time (hr) | Solid Concentration (%) | Solid Concentration (%) | NaOH molar ratio |
| PVA19 | 60 | 4.0 | 35.0 | 30 | 0.02 |
| PVA20 | 60 | 4.0 | 25.0 | 30 | 0.02 |
| PVA21 | 60 | 5.0 | 24.5 | 35 | 0.02 |
| PVA22 | 60 | 5.0 | 24.1 | 35 | 0.03 |
| PVA23 | 60 | 4.0 | 34.9 | 30 | 0.025 |

[1] Parts by weight

TABLE 4

| Type of PVA | Silyl Group-Having Monomer Content (mol %) | Degree of Polymerization | 1,2-Glycol Bond Content (mol %) | Degree of Hydrolysis (mol %) | (A − B)(B) | pH of 4% Aqueous Solution |
| --- | --- | --- | --- | --- | --- | --- |
| PVA15 | 0.20 | 1700 | 1.56 | 98.5 | 54.0/100 | 6.0 |
| PVA16 | 0.20 | 1700 | 1.56 | 98.1 | 0.04/100 | 6.0 |
| PVA17 | 0.20 | 1700 | 1.56 | 98.2 | 14.5/100 | 3.0 |
| PVA18 | 0.20 | 1700 | 1.56 | 99.3 | 7.2/100 | 8.5 |
| PVA19 | 0 | 1700 | 1.56 | 98.7 | — | 6.0 |
| PVA20 | 0 | 1000 | 1.56 | 98.4 | — | 6.0 |
| PVA21 | 0 | 500 | 1.56 | 98.2 | — | 6.0 |
| PVA22 | 0.03 | 500 | 1.56 | 98.8 | 0.4/100 | 6.0 |
| PVA23 | 0.50 | 1700 | 1.56 | 98.3 | 15.0/100 | 6.0 |
| PVA24 | 0 | 1700 | 1.56 | 93.3 | — | 6.0 |
| PVA25 | 0 | 500 | 1.56 | 92.6 | — | 6.0 |

TABLE 5

| | Type of PVA | Viscosity Stability of Aqueous PVA Solution | Water-resistance of Film with Inorganic Substance | Binding Force |
| --- | --- | --- | --- | --- |
| Example 1 | PVA1 | B | A | A |
| Example 2 | PVA2 | B | A | A |
| Example 3 | PVA3 | B | A | A |
| Example 4 | PVA4 | A | A | A |
| Example 5 | PVA5 | A | A | A |
| Example 6 | PVA6 | A | A | A |
| Example 7 | PVA7 | A | A | A |
| Example 8 | PVA8 | A | A | A |
| Example 9 | PVA9 | A | A | A |
| Example 10 | PVA10 | A | A | A |
| Example 11 | PVA11 | A | C | C |
| Example 12 | PVA12 | B | C | C |
| Example 13 | PVA13 | A | B | B |
| Example 14 | PVA14 | A | B | B |
| Comp. Ex. 1 | PVA15 | D | —[1] | —[1] |
| Comp. Ex. 2 | PVA16 | B | D | D |
| Comp. Ex. 3 | PVA17 | E | B | B |
| Comp. Ex. 4 | PVA18 | B | D | D |
| Comp. Ex. 5 | PVA19 | B | E | E |
| Comp. Ex. 6 | PVA20 | B | E | E |
| Comp. Ex. 7 | PVA21 | B | E | E |
| Comp. Ex. 8 | PVA22 | B | E | E |
| Comp. Ex. 9 | PVA23 | —[2] | —[2] | —[2] |
| Comp. Ex. 10 | PVA24 | A | E | E |
| Comp. Ex. 11 | PVA25 | A | E | E |

[1] Uniform aqueous solution with inorganic substance could not be prepared.
[2] PVA did not completely dissolve in an aqueous solution.

From the results in Table 5, it is understood that the polyvinyl alcohol of the invention has well-balanced properties of good viscosity stability of its aqueous solution, good water-resistance of its film with an inorganic substance, and good binding force with inorganic substances (Examples 1 to 14). In particular, when the polyvinyl alcohol satisfies the above-mentioned formula (III), $200<P<3790\times(0.2Y-1.40+2.87/Y)$ and (IV), $1.4\leq Y\leq 3.0$, then the balance of the physical properties of the polyvinyl alcohol is better (Examples 1 to 10 and Examples 13 and 14).

In addition, since the water-resistance of the film of the polyvinyl alcohol of the invention with an inorganic substance therein is good and since the binding force of the polyvinyl alcohol with inorganic substances is high, the polyvinyl alcohol is favorable for binders in ink-receiving layers in inkjet recording materials.

As opposed to these, it is understood that the polyvinyl alcohol of which (A−B)/(B) is over 50/100 could not form a uniform aqueous solution thereof that contains an inorganic substance (Comparative Example 1), and the polyvinyl alcohol of which (A−B)/(B) is less than 0.1/100 is not good since the water-resistance of its film containing an inorganic substance is poor and its binding force with inorganic substances is low (Comparative Example 2).

Further, the polyvinyl alcohol of which the pH of the aqueous 4% solution is lower than 4 is not good since the viscosity stability of its aqueous solution is low (Comparative Example 3); and the polyvinyl alcohol of which the pH of the aqueous 4% solution is higher than 8 is not also good since the water-resistance of its film containing an inorganic substance is low and its binding force with inorganic substances is low (Comparative Example 4).

The polyvinyl alcohol, of which P (viscosity-average degree of polymerization of polyvinyl alcohol)×S (silyl group functionalized monomer unit content of polyvinyl alcohol) is not larger than 20, is not good in point of the water-resistance of its film with an inorganic substance and of its binding force with inorganic substances (Comparative Example 8); and the polyvinyl alcohol of which P×S is not smaller than 370 could not completely dissolve in water and therefore could not be evaluated (Comparative Example 9).

In addition, it is further understood that the polyvinyl alcohol with no silyl group functionalized monomer therein is not good in point of the water-resistance of its film with an inorganic substance and its binding force with inorganic substances (Comparative Examples 5 to 7, 10 and 11).

II. Inkjet Recording Paper

Inkjet recoding paper was fabricated according to the method mentioned below, and its surface strength of ink-receiving layer was evaluated. Its print quality and water-resistance were also evaluated in the case of printing on the inkjet recording paper by using an inkjet printer.

Example 15

Aqueous 10% PVA1 solution was prepared. Silica (Mizusawa Chemical Industry's Mizukasil P78D) was dispersed in water by the use of a homogenizer to prepare an aqueous dispersion of 20% silica. To the aqueous silica dispersion, added was an aqueous 10% PVA1 solution and cationic polymer (Showa Polymer's Polyfix700) in such a manner that the solid content-based ratio by weight of silica/PVA/cationic polymer may be 100/30/3, and a necessary amount of water was added thereto to prepare a coating liquid having a solid concentration of 14% for an ink-receiving layer.

Using a BL-type viscometer, the liquid was measured at 30° C. and at 30 rpm. Immediately after its preparation, the viscosity of the coating liquid was 540 mPa·s. After left at 30° C. for 1 week, the viscosity was 1.72 times that of the coating liquid just after its preparation, or that is, there was found little viscosity change before and after the storage of the coating liquid and the viscosity stability thereof was good.

The above-mentioned coating liquid for ink-receiving layer was applied onto the surface of base paper (woodfree paper having a weight of 60 g/m$^2$), using a wire bar coater, and its coating amount was 11 g/m$^2$ in terms of the solid content thereof. This was dried with a hot air drier at 100° C. for 3 minutes to be an inkjet recording paper.

Surface Strength of Ink-receiving Layer:

A pressure sensitive adhesive tape (Nichiban's Cellotape) was stuck on a surface of ink-receiving layer of a given inkjet recording paper, and a pressure of 0.5 kg/cm$^2$ was applied thereto. The paper was left at 25° C., 60% RH for 24 hours, then the adhesive tape was peeled off at an angle of 180 degrees at the interface. And was observed an amount of substance that was peeled from the ink-receiving layer and was stuck on the adhesive layer surface of the tape. This was evaluated according to the criteria mentioned below.

A: No substance peeled off from ink-receiving layer was observed on the surface of adhesive tape.

B: Quite a small amount of substance peeled off from ink-receiving layer was observed on the surface, of adhesive tape.

C: The substance peeled off from ink-receiving layer was partly observed on the surface of adhesive tape.

D: The substance peeled off from ink-receiving layer was observed on the whole surface of adhesive tape.

Print Quality:

A section of a given inkjet recording paper was painted out by using an inkjet printer (EPSON's PM-970C) with black ink, and then print quality was observed. This was evaluated according to the criteria mentioned below.

A: The image density was uniform in the whole image area and the printed image was good.

B: Little unevenness of image density was observed and the printed image was not almost damaged.

C: Unevenness of image density was partly occurred in the image area and the quality of printed image was lowered.

D: Unevenness of image density was occurred in the whole image area and the quality of printed image was extremely lowered.

Water-resistance:

A section of a given inkjet recording paper was painted out by using an inkjet printer (EPSON's PM-970C) with black ink. 1 ml of water was dropped on the edge of the printed area by syringe. The paper was left for 24 hours, and then was observed the extent of blur in the area spotted with water. This was evaluated according to the following criteria:

A: No blur was observed.

B: Blur was scarcely observed.

C: Blur was partly spread.

D: Blur was entirely spread in the area spotted with water.

Examples 16 to 28

Inkjet recording paper was fabricated in the same manner as in Example 15, for which, however, the silyl group functionalized PVAs shown in Table 6 were used in place of the silyl group functionalized PVAs used in Example 15. The surface strength of ink-receiving layer of the paper, and the print quality and water resistance of the paper printed with an inkjet printer were evaluated. The results are shown in Table 6.

Comparative Examples 12 to 21

Inkjet recording paper was fabricated in the same manner as in Example 15, for which, however, the PVAs shown in Table 6 were used in place of the silyl group functionalized PVAs used in Example 15. The surface strength of ink-receiving layer of the paper, and the print quality and water resistance of the paper printed with an inkjet printer were evaluated. The results are shown in Table 6.

TABLE 6

| | Type of PVA | PVA/ Silica | Coating Liquid for Ink-receiving Layer | | Surface Strength of Ink-receiving Layer | Print Quality | Water resistance |
| --- | --- | --- | --- | --- | --- | --- | --- |
| | | | Viscosity[1] | Viscosity change[2] | | | |
| Example 15 | PVA 1 | 30/100 | 540 | 1.72 | A | A | A |
| Example 16 | PVA 2 | 30/100 | 380 | 1.60 | A | A | A |
| Example 17 | PVA 3 | 50/100 | 420 | 1.98 | A | A | A |
| Example 18 | PVA 4 | 15/100 | 270 | 1.07 | A | A | A |
| Example 19 | PVA 5 | 20/100 | 310 | 1.18 | A | A | A |
| Example 20 | PVA 6 | 50/100 | 400 | 1.10 | A | A | A |
| Example 21 | PVA 7 | 60/100 | 420 | 1.42 | A | B | A |

TABLE 6-continued

|  | Type of PVA | PVA/ Silica | Coating Liquid for Ink-receiving Layer | | Surface Strength of Ink-receiving Layer | Print Quality | Water resistance |
| --- | --- | --- | --- | --- | --- | --- | --- |
|  |  |  | Viscosity[1] | Viscosity change[2] |  |  |  |
| Example 22 | PVA 8 | 45/100 | 510 | 1.08 | A | A | A |
| Example 23 | PVA 9 | 15/100 | 260 | 1.06 | A | A | A |
| Example 24 | PVA10 | 5/100 | 180 | 1.04 | A | A | A |
| Example 25 | PVA11 | 30/100 | 550 | 1.06 | B | B | C |
| Example 26 | PVA12 | 100/100 | 105 | 2.20 | B | C | C |
| Example 27 | PVA13 | 30/100 | 530 | 1.12 | B | B | B |
| Example 28 | PVA14 | 30/100 | 350 | 1.03 | B | B | B |
| Comp. Example 12 | PVA15 | 25/100 | —[3] | —[3] | —[5] | —[5] | —[5] |
| Comp. Example 13 | PVA16 | 30/100 | 510 | 2.42 | D | B | C |
| Comp. Example 14 | PVA17 | 30/100 | 590 | 30.4 | B | B | C |
| Comp. Example 15 | PVA18 | 30/100 | 530 | 2.31 | D | B | C |
| Comp. Example 16 | PVA19 | 50/100 | 440 | 1.59 | D | C | D |
| Comp. Example 17 | PVA20 | 80/100 | 460 | 1.63 | D | D | D |
| Comp. Example 18 | PVA21 | 100/100 | 390 | 1.71 | D | D | D |
| Comp. Example 19 | PVA22 | 30/100 | 320 | 1.61 | D | B | D |
| Comp. Example 20 | PVA23 | 30/100 | —[4] | —[4] | —[5] | —[5] | —[5] |
| Comp. Example 21 | PVA24 | 50/100 | 420 | 1.21 | D | C | D |
| Comp. Example 22 | PVA25 | 100/100 | 370 | 1.24 | D | D | D |

[1] The viscosity of the coating liquid measured with a BL-type viscometer at 30° C. and at 30 rpm, just after the preparation thereof. (unit: mPa · s)
[2] (viscosity of coating liquid left at 30° C. for 1 week)/(viscosity of coating liquid just after its preparation).
[3] Uniform coating liquid could not be prepared.
[4] PVA did not completely dissolve in an aqueous solution.
[5] Uniform coating layer could not be prepared.

From the results in Table 6, it is understood that the inkjet recording paper in which the polyvinyl alcohol of the invention is used for the binder in the ink-receiving layer has high surface strength of ink-receiving layer, and also has good print quality and good water-resistance when the recording paper is printed by using an inkjet printer (Examples 15 to 28).

In particular, when the polyvinyl alcohol used in the ink-receiving layer satisfies the above-mentioned formula (III), $200 < P < 3790 \times (0.2Y - 1.40 + 2.87/Y)$ and (IV), $1.4 \leq Y \leq 3.0$, then the balance of the properties of the inkjet recording paper is better (Examples 15 to 24 and Examples 27 and 28).

As opposed to these, the polyvinyl alcohol of which (A−B)/(B) is over 50/100 could not form a uniform coating liquid for ink-receiving layer (Comparative Example 12). And it is understood that, when the polyvinyl alcohol of which (A−B)/(B) is less than 0.1/100 is used for the binder of ink-receiving layer, the surface strength of ink-receiving layer and water-resistance of the recording paper is poor (Comparative Example 13).

Further, the polyvinyl alcohol of which the pH of aqueous 4% solution is lower than 4 is used for the binder of the ink-receiving layer to make the viscosity stability of coating liquid for ink-receiving layer lowered (Comparative Example 14); and when the polyvinyl alcohol of which the pH of aqueous 4% solution is higher than 8 is used for the binder of the ink-receiving layer, the surface strength of ink-receiving layer and the water-resistance of recording paper are not good (Comparative Example 15).

In the case of using the polyvinyl alcohol, of which P (viscosity-average degree of polymerization of polyvinyl alcohol)×S (silyl group functionalized monomer unit content of polyvinyl alcohol) is not larger than 20, as the binder of ink-receiving layer, the surface strength of ink-receiving layer and the water-resistance of the recording paper is not good (Comparative Example 19); and the polyvinyl alcohol of which P×S is not smaller than 370 could not completely dissolve in water and therefore could not be evaluated (Comparative Example 20).

The polyvinyl alcohol with no silyl group functionalized monomer therein is not good for the binder of ink-receiving layer, in point of the surface strength of ink-receiving layer, the print quality and water-resistance of the recording paper (Comparative Examples 16 to 18, 21 and 22).

III. Thermal Recording Paper

Thermal recoding paper was fabricated according to the method mentioned below, and its water-resistance and plasticizer resistance were evaluated.

Example 29

(1) Preparation of Aqueous Dispersions of Thermo-sensitive Dye, Developer and Pigment:

| Composition of aqueous dispersion A of thermo-sensitive dye: | |
| --- | --- |
| Leuco dye (Yamada Chemical's S-205) | 20% |
| Aqueous solution of 10% PVA (Kuraray's PVA203) | 20% |
| Water | 59.9% |
| Defoaming agent (Clarient's Jorshin LD-B) | 0.1% |
| Composition of aqueous dispersion B of developer: | |
| Bisphenol A | 20% |
| Aqueous solution of 10% PVA (Kuraray's PVA203) | 20% |
| Water | 59.9% |
| Defoaming agent (Clarient's Jorshin LD-B) | 0.1% |
| Composition of aqueous dispersion C of pigment: | |
| Stearamide | 10% |
| Silica (Mizusawa Chemical's Mizukasil P-527) | 20% |
| Aqueous solution of 5% PVA (Kuraray's PVA205) | 30% |
| Water | 40% |

Aqueous dispersion A, aqueous dispersion B and aqueous dispersion C each having the composition mentioned above were prepared separately, and each was pre-stirred in a beaker for 15 minutes.

Next, the aqueous dispersion A was transferred into a sand grinder (Kansai Paint's batch-type desktop sand grinder), to which were added 300 ml of glass beads (soda-quartz glass beads having a diameter of 0.5 mm), and this was rotated at a high revolution (2170 rpm) with cooling for 6 hours to disperse the dispersoid. This was analyzed with a laser diffraction-type grain size analyzer (Shimadzu's SALD-1000), and the dispersoid particle size of the aqueous dispersion A of thermo-sensitive dye was 0.46 µm. In addition, this was analyzed with a color difference meter (Nippon Denshoku Kogyo's Z-1001DP), and the degree of whiteness of the aqueous dispersion A was −8.1. Regarding the degree of whiteness, 0 means that the sample analyzed is completely white, and a larger minus value means that the sample analyzed is colored more.

In the same manner, the aqueous dispersion B was transferred into a sand grinder of the same type, to which were added 300 ml of glass beads (soda-quartz glass beads having a diameter of 0.5 mm), and this was rotated at a high revolution (2170 rpm) with cooling for 6 hours to disperse the dispersoid.

The aqueous dispersion C was transferred into a homogenizer, and its dispersoid was dispersed at a revolution of 10000 rpm for 2 minutes.

(2) Preparation of Coating Liquid for Thermo-sensitive Coloring Layer:

2 parts of the aqueous dispersion A, 4 parts of the aqueous dispersion B, 2 parts of the aqueous dispersion C and 2 parts of an aqueous solution of 10% PVA3 were mixed and stirred, to which a necessary amount of water was added to prepare a coating liquid having a solid concentration of 21% for a thermo-sensitive coloring layer.

Using a BL-type viscometer, the liquid was measured at 30° C. and at 30 rpm. Immediately after its preparation, the viscosity of the coating liquid was 290 mPa·s. After left at 30° C. for 1 week, the viscosity was 1.07 times that of the coating liquid just after its preparation, or that is, there was found little viscosity change before and after the storage of the coating liquid and the viscosity stability thereof was good.

(3) Preparation of Coating Liquid for Overcoat Layer:

0.15% of a defoaming agent (Clarient's Jorshin LD-B) was added to PVA1, to prepare an aqueous 12% PVA1 solution. 72.5 parts of water was added to 0.2 parts of ethylene glycol-propylene glycol copolymer (Nippon Yushi's Pronon 104) and 50 parts of silica (Mizusawa Chemical's Mizukasil P-527). With fully dispersing it, 690 parts of the aqueous 12% PVA1 solution was gradually added to it at room temperature, and then 7.5 parts of zinc stearate dispersion (Chukyo Yushi's Hidrin Z730, having a solid concentration of 30%) was added thereto to prepare an aqueous dispersion of PVA1 with silica.

With stirring the aqueous dispersion of PVA1 with silica thus prepared, 30 parts of an aqueous solution of 10% titanium lactate was gradually added thereto at room temperature, to which a necessary amount of water was added to prepare a coating liquid for a overcoat layer having a solid concentration of 15%.

Using a BL-type viscometer, the liquid was measured at 30° C. and at 30 rpm. Immediately after its preparation, the viscosity of the coating liquid was 620 mPa·s. After left at 30° C. for 1 week, the viscosity was 2.24 times that of the coating liquid just after its preparation.

(4) Fabrication of Thermal Recording Paper:

The coating liquid for thermo-sensitive coloring layer that had been prepared in the above (2) was applied onto the surface of base paper (woodfree paper having a weight of 52 g/m$^2$), using a wire bar coater, and its coating amount was 6 g/m$^2$ in terms of the solid content thereof. This was dried at 50° C. for 5 minutes. The coated paper was surface-treated with a supercalender (linear pressure: 30 kg/cm). Then, the coating liquid for overcoat layer that had been prepared in the above (3) was applied onto the surface of the coated paper, using a wire bar coater, and its coating amount was 3 g/m$^2$ in terms of the solid content thereof. This was dried at 50° C. for 10 minutes. The coated paper was surface-treated with a supercalender (linear pressure: 30 kg/cm) to be thermal recording paper.

Immediately after its fabrication, the thermal recording paper was set in a thermal printer for facsimiles (Ricoh's Refax 300) and printed thereon, and its water-resistance and plasticizer resistance were evaluated according to the methods mentioned below. The results are shown in Table 7.

Water-resistance:

The printed paper was dipped in distilled water at 20° C. for 24 hours, and then its image density and wet rubbing resistance were evaluated in the manner mentioned below.

Image Density:

Before and after dipped in distilled water, the color density of the image area of the printed paper was measured with a Macbeth densitometer (Macbeth's Model RD-514). In point of water resistance, it was better for the thermal recording paper having kept higher image density after dipped in distilled water. Based on this, the samples were ranked into five ranks, from 1 (the worst) to 5 (the best).

Wet Rubbing Resistance:

The surface of the image area of the printed paper was rubbed with fingers, and checked for an amount of the coating which was come off on fingers. In view of water resistance, it was better for the thermal recording paper that the amount of the coating come off on fingers was less. Based on this, the samples were ranked into five ranks, from 1 (the worst) to 5 (the best).

Plasticizer Resistance:

A soft polyvinyl chloride film was put on the printed paper, and kept at 30° C. under a load of 300 g/m$^2$ for 24 hours. The image density of the thus-tested paper was measured with a Macbeth densitometer (Macbeth's Model RD-514) and compared with that of the paper before the test. In point of Plasticizer resistance, it was better for the thermal recording paper having kept higher image density after contact with a soft polyvinyl chloride. Based on this, the samples were ranked into five ranks, from 1 (the worst) to 5 (the best).

Examples 30 to 45

Thermal recording paper was fabricated in the same manner as in Example 29, for which, however, the silyl group functionalized PVAs shown in Table 7 were used in place of the silyl group functionalized PVAs used in Example 29, and its water-resistance and plasticizer resistance were evaluated. The results are shown in Table 7.

Example 46

(1) Preparation of Aqueous Dispersions of Thermo-sensitive Dye, Developer and Pigment:

| Composition of aqueous dispersion A of thermo-sensitive dye: | |
| --- | --- |
| Leuco dye (Yamada Chemical's S-205) | 20% |
| Aqueous solution of 10% PVA (Kuraray's PVA203) | 20% |
| Water | 59.9% |
| Defoaming agent (Clarient's Jorshin LD-B) | 0.1% |
| Composition of aqueous dispersion B of developer: | |
| Bisphenol A | 20% |
| Aqueous solution of 10% PVA (Kuraray's PVA203) | 20% |

-continued

| | |
|---|---|
| Water | 59.9% |
| Defoaming agent (Clarient's Jorshin LD-B) | 0.1% |
| Composition of aqueous dispersion C of pigment: | |
| Stearamide | 10% |
| Silica (Mizusawa Chemical's Mizukasil P-527) | 20% |
| Aqueous solution of 5% PVA (Kuraray's PVA205) | 30% |
| Water | 40% |

Aqueous dispersion A, aqueous dispersion B and aqueous dispersion C each having the composition mentioned above were prepared separately, and each was pre-stirred in a beaker for 15 minutes.

Next, the aqueous dispersion A was transferred into a sand grinder (Kansai Paint's batch-type desktop sand grinder), to which were added 300 ml of glass beads (soda-quartz glass beads having a diameter of 0.5 mm), and this was rotated at a high revolution (2170 rpm) with cooling for 6 hours to disperse the dispersoid. This was analyzed with a laser diffraction-type grain size analyzer (Shimadzu's SALD-1000), and the dispersoid particle size of the aqueous dispersion A of thermo-sensitive dye was 0.46 μm. In addition, this was analyzed with a color difference meter (Nippon Denshoku Kogyo's Z-1001DP), and the degree of whiteness of the aqueous dispersion A was −8.1.

In the same manner, the aqueous dispersion B was transferred into a sand grinder of the same type, to which were added 300 ml of glass beads (soda-quartz glass beads having a diameter of 0.5 mm), and this was rotated at a high revolution (2170 rpm) with cooling for 6 hours to disperse the dispersoid.

The aqueous dispersion C was transferred into a homogenizer, and its dispersoid was dispersed at a revolution of 10000 rpm for 2 minutes.

(2) Preparation of Coating Liquid for Thermo-sensitive Coloring Layer:

2 parts of the aqueous dispersion A, 4 parts of the aqueous dispersion B, 2 parts of the aqueous dispersion C and 2 parts of an aqueous solution of 10% PVA3 were mixed and stirred, to which 0.3 part of an aqueous solution of 10% titanium lactate was slowly added at room temperature and a necessary amount of water was added, to prepare a coating liquid having a solid concentration of 21% for a thermo-sensitive coloring layer.

Using a BL-type viscometer, the liquid was measured at 30° C. and at 30 rpm. Immediately after its preparation, the viscosity of the coating liquid was 330 mPa·s. After left at 30° C. for 1 week, the viscosity was 2.17 times that of the coating liquid just after its preparation.

(3) Fabrication of Thermal Recording Paper:

The coating liquid for thermo-sensitive coloring layer that had been prepared in the above (2) was applied onto the surface of base paper (woodfree paper having a weight of 52 g/m$^2$), using a wire bar coater, and its coating amount was 6 g/m$^2$ in terms of the solid content thereof. This was dried at 50° C. for 5 minutes. The coated paper was surface-treated with a supercalender (linear pressure: 30 kg/cm) to be thermal recording paper. Its water-resistance and plasticizer resistance were evaluated in the same manner as in Example 29. The results are shown in Table 7.

Examples 47 and 48

Thermal recording paper was fabricated in the same manner as in Example 46, for which, however, the silyl group functionalized PVAs shown in Table 7 were used in place of the silyl group functionalized PVAs used in Example 46, and its water-resistance and plasticizer resistance were evaluated. The results are shown in Table 7.

TABLE 7

| | PVA used in Thermo-sensitive coloring layer | Coating Liquid for Thermo-sensitive coloring layer | | PVA used in Overcoat layer | Coating Liquid for Overcoat layer | | Water-resistance | | Plasticizer Resistance |
|---|---|---|---|---|---|---|---|---|---|
| | | Viscosity[1] | Viscosity Change[2] | | Viscosity[1] | Change[2] | Image Density | Wet Rubbing Resistance | |
| Example 29 | PVA3 | 290 | 1.07 | PVA1 | 620 | 2.24 | 5 | 5 | 5 |
| Example 30 | PVA3 | 290 | 1.07 | PVA2 | 470 | 2.29 | 5 | 5 | 4 |
| Example 31 | PVA3 | 290 | 1.07 | PVA3 | 350 | 2.10 | 4 | 4 | 4 |
| Example 32 | PVA3 | 290 | 1.07 | PVA4 | 650 | 1.07 | 5 | 5 | 5 |
| Example 33 | PVA3 | 290 | 1.07 | PVA5 | 480 | 1.07 | 5 | 5 | 5 |
| Example 34 | PVA14 | 310 | 1.08 | PVA6 | 350 | 1.05 | 4 | 4 | 4 |
| Example 35 | PVA14 | 310 | 1.08 | PVA7 | 330 | 1.04 | 4 | 4 | 4 |
| Example 36 | PVA14 | 310 | 1.08 | PVA8 | 430 | 1.22 | 4 | 4 | 4 |
| Example 37 | PVA3 | 290 | 1.07 | PVA9 | 620 | 1.06 | 5 | 5 | 5 |
| Example 38 | PVA3 | 290 | 1.07 | PVA10 | 810 | 1.19 | 5 | 5 | 5 |
| Example 39 | PVA14 | 310 | 1.08 | PVA11 | 630 | 1.05 | 3 | 3 | 4 |
| Example 40 | PVA14 | 310 | 1.08 | PVA12 | 120 | 2.36 | 3 | 3 | 3 |
| Example 41 | PVA14 | 310 | 1.08 | PVA13 | 620 | 1.06 | 4 | 4 | 5 |
| Example 42 | PVA14 | 310 | 1.08 | PVA14 | 340 | 1.02 | 4 | 4 | 4 |
| Example 43 | PVA3 | 290 | 1.07 | PVA17 | 1020 | 1.53 | 3 | 3 | 4 |
| Example 44 | PVA3 | 290 | 1.07 | PVA18 | 680 | 2.41 | 3 | 3 | 4 |
| Example 45 | PVA14 | 310 | 1.08 | PVA19 | 470 | 2.62 | 3 | 3 | 4 |
| Example 46 | PVA3 | 330 | 2.17 | | —[3] | | 3 | 3 | 3 |
| Example 47 | PVA6 | 350 | 1.20 | | —[3] | | 3 | 3 | 3 |
| Example 48 | PVA14 | 320 | 1.17 | | —[3] | | 3 | 3 | 3 |

[1]The viscosity of the coating liquid measured with a BL-type viscometer at 30° C. and at 30 rpm, just after the preparation thereof. (unit: mPa · s)
[2](viscosity of coating liquid left at 30° C. for 1 week)/(viscosity of coating liquid just after its preparation).
[3]Overcoat layer was absent.

Comparative Examples 23 to 33

Thermal recording paper was fabricated in the same manner as in Example 29, for which, however, the PVAs shown in Table 8 were used in place of the silyl group functionalized PVAs used in Example 29, and its water-resistance and plasticizer resistance were evaluated. The results are shown in Table 8.

Comparative Examples 34 to 36

Thermal recording paper was fabricated in the same manner as in Example 46, for which, however, the PVAs shown in Table 8 were used in place of the silyl group functionalized PVAs used in Example 46, and its water-resistance and plasticizer resistance were evaluated. The results are shown in Table 8.

is lower than 4 is used for the overcoat layer to make the viscosity stability of coating liquid for overcoat layer lowered (Comparative Example 25). And when the polyvinyl alcohol of which the pH of aqueous 4% solution is higher than 8 is used for the overcoat layer, the water-resistance of thermal recording paper is not good (Comparative Example 26).

Further, in the case of using the polyvinyl alcohol, of which P (viscosity-average degree of polymerization of polyvinyl alcohol)×S (silyl group functionalized monomer unit content of polyvinyl alcohol) is not larger than 20, for the thermo-sensitive coloring layer and overcoat layer, the water-resistance of thermal recording paper is not good (Comparative Examples 27 to 30, 32 and 33), and the polyvinyl alcohol of which P×S is not smaller than 370 could not completely dissolve in water and therefore could not be evaluated (Comparative Example 31).

TABLE 8

|  | PVA used in Thermo-sensitive coloring layer | Coating Liquid for Thermo-sensitive coloring layer | | PVA used in Overcoat layer | Coating Liquid for Overcoat layer | | Water-resistance | | |
|---|---|---|---|---|---|---|---|---|---|
|  |  | Viscosity[1] | Viscosity Change[2] |  | Viscosity[1] | Viscosity Change[2] | Image Density | Wet Rubbing Resistance | Plasticizer Resistance |
| Comp. Ex. 23 | PVA21 | 250 | 1.03 | PVA15 | 890 | —[3] | —[5] | —[5] | —[5] |
| Comp. Ex. 24 | PVA21 | 250 | 1.03 | PVA16 | 650 | 2.39 | 1 | 1 | 5 |
| Comp. Ex. 25 | PVA21 | 250 | 1.03 | PVA17 | 1020 | 15.3 | 2 | 2 | 5 |
| Comp. Ex. 26 | PVA21 | 250 | 1.03 | PVA18 | 680 | 2.41 | 2 | 2 | 5 |
| Comp. Ex. 27 | PVA22 | 265 | 1.05 | PVA19 | 470 | 2.62 | 1 | 1 | 5 |
| Comp. Ex. 28 | PVA22 | 265 | 1.05 | PVA20 | 430 | 2.36 | 1 | 1 | 4 |
| Comp. Ex. 29 | PVA22 | 265 | 1.05 | PVA21 | 380 | 2.29 | 1 | 1 | 3 |
| Comp. Ex. 30 | PVA22 | 265 | 1.05 | PVA22 | 380 | 2.31 | 2 | 2 | 3 |
| Comp. Ex. 31 | PVA25 | 240 | 1.03 | PVA23 | —[4] | —[4] | —[5] | —[5] | —[5] |
| Comp. Ex. 32 | PVA25 | 240 | 1.03 | PVA24 | 420 | 1.07 | 1 | 1 | 5 |
| Comp. Ex. 33 | PVA25 | 240 | 1.03 | PVA25 | 360 | 1.08 | 1 | 1 | 3 |
| Comp. Ex. 34 | PVA21 | 270 | 1.13 |  | —[6] |  | 1 | 1 | 1 |
| Comp. Ex. 35 | PVA22 | 275 | 1.10 |  | —[6] |  | 1 | 1 | 1 |
| Comp. Ex. 36 | PVA25 | 250 | 10.5 |  | —[6] |  | 1 | 1 | 1 |

[1]The viscosity of the coating liquid measured with a BL-type viscometer at 30° C. and at 30 rpm, just after the preparation thereof. (unit: mPa · s)
[2](viscosity of coating liquid left at 30° C. for 1 week)/(viscosity of coating liquid just after its preparation).
[3]Coating liquid left at 30° C. for 1 week was not uniform.
[4]PVA did not completely dissolve in an aqueous solution.
[5]Uniform coating layer could not be prepared.
[6]Overcoat layer was absent.

From the results in Table 7, it is understood that the thermal recording paper, in which the polyvinyl alcohol of the invention is used for at least one layer selected from the thermo-sensitive coloring layer and the overcoat layer, has good water-resistance and good plasticizer resistance (Examples 29 to 48).

In particular, when the polyvinyl alcohol used in the overcoat layer satisfies the above-mentioned formula (III), 200<P<3790×(0.2Y−1.40+2.87/Y) and (IV), 1.4≦Y≦3.0, then the balance of the properties of the thermal recording paper is better (Examples 29 to 38, 41 and 42).

On the other hand, it is understood that when the polyvinyl alcohol of the invention is used for neither the thermo-sensitive coloring layer nor the overcoat layer, at least either water-resistance or plasticizer resistance of the thermal recording paper is poor (Comparative Examples 23 to 36).

Of these, the polyvinyl alcohol of which (A−B)/(B) is over 50/100 cannot form a uniform coating liquid for overcoat layer (Comparative Example 23). In case that the polyvinyl alcohol of which (A−B)/(B) is less than 0.1/100 is used for the overcoat layer, the water-resistance of thermal recording paper is poor (Comparative Example 24). The polyvinyl alcohol of which the pH of aqueous 4% solution When the polyvinyl alcohol of the invention is not used for the thermo-sensitive coloring layer and the overcoat layer is absent, both water-resistance and plasticizer resistance of the thermal recording paper is poor (Comparative Examples 34 to 36).

The silyl group functionalized polyvinyl alcohol of the invention can dissolve in water to prepare its aqueous solution even when an alkali such as sodium hydroxide or an acid is not added thereto, and, in addition, it satisfies all the requirements that the viscosity stability of the aqueous solution thereof is good, the water-resistance of the film formed of the aqueous solution thereof is good, the water-resistance of the film with an inorganic substance therein is also good, and the binding force thereof with inorganic substances is high. Therefore, the polyvinyl alcohol of the invention has many applications, and especially an excellent performance as coating agents to be combined with inorganic substances. And the coating agent that contains the silyl group functionalized polyvinyl alcohol of the invention is applied to substrates to produce inkjet recording material and thermal recording material having excellent properties such as water-resistance.

Japanese application 203744/2002 filed on Jul. 11, 2002 is incorporated by reference herein in its entirety.

Obviously, numerous modifications and variations of the present invention are possible in light of the above teachings. It is therefore to be understood that within the scope of the appended claims, the invention may be practiced otherwise than as specifically described herein.

What is claimed is:

1. A polyvinyl alcohol having silyl group functionalized monomer units of formula (1):

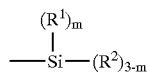

wherein $R^1$ represents an alkyl group having from 1 to 5 carbon atoms; $R^2$ represents an alkoxyl or acyloxyl group; and m is an integer of from 0 to 2,
which is obtained by copolymerizing a vinyl ester monomer with a monomer having a silyl group of formula (2) to form a polyvinyl ester, and then hydrolyzing the polyvinyl ester,

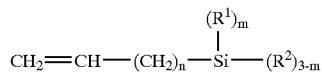

wherein $R^1$ represents an alkyl group having from 1 to 5 carbon atoms; $R^2$ represents an alkoxyl or acyloxyl group; m indicates in integer of from 0 to 2; and n is an integer of from 0 to 4,
wherein the polyvinyl alcohol satisfies the following formulae (I) and (II):

$$20 < P \times S < 370 \quad \text{(I)}$$

wherein P is the viscosity-average degree of polymerization of the polyvinyl alcohol; and S is the content (mol %) of the silyl group functionalized monomer units of formula (1) in the polyvinyl alcohol, $$0.1/100 \leq (A-B)/(B) \leq 50/100 \quad \text{(II)}$$

wherein A is the silicon atom content of the polyvinyl alcohol in ppm; B is the silicon atom content of the polyvinyl alcohol in ppm after the polyvinyl alcohol has been first washed with a sodium hydroxide-containing methanol solution and then washed by Soxhlet extraction with methanol; and A and B are measured by ICP emission spectrometry of an ashed sample of the polyvinyl alcohol, and
wherein an aqueous 4% solution of the polyvinyl alcohol has a pH of from 4 to 8.

2. The polyvinyl alcohol as claimed in claim 1, which satisfies the following formulae (III) and (IV):

$$200 < P < 3790 \times (0.2Y - 1.40 + 2.87/Y) \quad \text{(III)}$$

$$1.4 \leq Y \leq 3.0 \quad \text{(IV)}$$

wherein P is the viscosity-average degree of polymerization of the polyvinyl alcohol; and Y is the 1,2-glycol bond content of the polyvinyl alcohol in mol %.

3. A coating agent that contains the polyvinyl alcohol of claim 1.

4. A coated article produced by applying the coating agent of claim 3 to a substrate.

5. An inkjet recording material produced by applying the coating agent of claim 3 to a substrate.

6. A thermal recording material produced by applying the coating agent of claim 3 to a substrate.

7. The polyvinyl alcohol as claimed in claim 1, wherein $R^2$ is an alkoxyl or acyloxyl group having an oxygen-containing substituent.

8. The polyvinyl alcohol as claimed in claim 1, wherein $$40 < P \times S < 360.$$

9. The polyvinyl alcohol as claimed in claim 1, wherein $$80 < P \times S < 350.$$

10. The polyvinyl alcohol as claimed in claim 1, wherein $$0.3/100 \leq (A-B)/(B) \leq 25/100.$$

11. The polyvinyl alcohol as claimed in claim 1, wherein $$0.4/100 \leq (A-B)/(B) \leq 20/100.$$

12. The polyvinyl alcohol as claimed in claim 1 having a degree of hydrolysis of at least 98 mol %.

13. The polyvinyl alcohol as claimed in claim 1, wherein the hydrolyzed silyl group functionalized monomer units are present in an amount of from 0.05 to 1.0 mol %.

14. The polyvinyl alcohol as claimed in claim 1, wherein the hydrolyzed silyl group functionalized monomer units are present in an amount of from 0.2 to 0.5 mol %.

15. A method for producing the polyvinyl alcohol of claim 1, which comprises:
    copolymerizing a vinyl ester monomer with a vinyl trimethoxy silane.

* * * * *